US011919662B2

(12) United States Patent
Rhoads et al.

(10) Patent No.: US 11,919,662 B2
(45) Date of Patent: Mar. 5, 2024

(54) SYSTEM TO MANAGE CONSTELLATION OF SATELLITES

(71) Applicant: AMAZON TECHNOLOGIES, INC., Seattle, WA (US)

(72) Inventors: Jason A. Rhoads, Carnation, WA (US); Darren Andrew Schumacher, Ann Arbor, MI (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 232 days.

(21) Appl. No.: 17/100,276

(22) Filed: Nov. 20, 2020

(65) Prior Publication Data

US 2022/0161944 A1 May 26, 2022

(51) Int. Cl.
*B64G 1/24* (2006.01)
*B64G 1/10* (2006.01)
(Continued)

(52) U.S. Cl.
CPC ............. *B64G 1/24* (2013.01); *B64G 1/1085* (2013.01); *B64G 1/242* (2013.01); *B64G 3/00* (2013.01);
(Continued)

(58) Field of Classification Search
CPC .......... B64G 1/10; B64G 1/1085; B64G 3/00; G05D 1/02
See application file for complete search history.

(56) References Cited

U.S. PATENT DOCUMENTS 6,133,870 A 10/2000 Wehner
8,193,968 B1 6/2012 Kia et al.
(Continued)

FOREIGN PATENT DOCUMENTS

EP 3493428 A1 6/2019
WO 0126249 A1 4/2001

OTHER PUBLICATIONS

Weber, Carlos, "International Search Report and the Written Opinion of the International Searching Authority dated Jan. 28, 2022", Patent Cooperation Treaty Application No. PCT/US21/72000, Patent Cooperation Treaty, dated Jan. 28, 2022.

*Primary Examiner* — Angela Y Ortiz
*Assistant Examiner* — Aaron K McCullers
(74) *Attorney, Agent, or Firm* — Lindauer Law, PLLC

(57) ABSTRACT

A constellation of many satellites provide communication between devices such as user terminals (UTs) and ground stations that are connected to other networks, such as the Internet. A constellation management system (CMS) facilitates management and operation of the satellites in the constellation and facilitates information exchange with other authorized systems to provide for situationally aware operation. The CMS may ingest data such as satellite telemetry, space weather data, object ephemeris data about other orbital objects, and so forth. The CMS uses the ingested data to automatically operate satellites to perform routine activities such as station keeping maneuvers, maintenance activities, interference mitigation, and so forth. Confirmation from a human operator may be obtained before performing some activities. Activities may be planned and coordinated to minimize resource consumption for the individual satellite as well as the constellation. Output, such as ephemeris data, may be provided to other parties as well.

20 Claims, 13 Drawing Sheets

800

PREDICTED T=1
VOLUME 804(1)
SATELLITE 102(1)
OBJECT 806
SATELLITE 102(2)
EARTH 802
VOLUME 804(2)

ACTUAL T=1
SATELLITE 102(1)
OBJECT 806
SATELLITE 102(2)
EARTH 802
RADIO SIGNALS 808

(51) Int. Cl.
*B64G 3/00* (2006.01)
*G05D 1/00* (2006.01)
*H04B 7/185* (2006.01)

(52) U.S. Cl.
CPC ......... *G05D 1/0094* (2013.01); *H04B 7/1851* (2013.01); *H04B 7/18513* (2013.01); *H04B 7/18519* (2013.01); *B64G 1/247* (2023.08)

(56) References Cited

U.S. PATENT DOCUMENTS

| | | | | |
|---|---|---|---|---|
| 9,651,946 | B1* | 5/2017 | Rubel | B64G 1/1021 |
| 2012/0046863 | A1* | 2/2012 | Hope | B64G 3/00 701/531 |
| 2012/0158216 | A1 | 6/2012 | Kim et al. | |
| 2015/0362597 | A1* | 12/2015 | Syrjärinne | G01S 19/27 342/357.58 |
| 2017/0033455 | A1* | 2/2017 | Husted | H01Q 3/247 |
| 2017/0212243 | A1* | 7/2017 | Darapu | G01S 19/28 |
| 2018/0346153 | A1 | 12/2018 | Kaplan | |
| 2019/0146092 | A1* | 5/2019 | MacDonald | G01S 19/072 342/357.44 |
| 2019/0300208 | A1* | 10/2019 | Fitzgerald | B64G 1/10 |
| 2020/0039665 | A1* | 2/2020 | Vaujour | B64G 1/242 |

* cited by examiner

TELEMETRY DATA 354

| PARAMETER 502 | VALUE 504 |
|---|---|
| SATELLITE IDENTIFIER | 1937 |
| POSITION DATA | 48.9319,-119.4397,601 |
| PROPELLANT QUANTITY | 951 GRAMS |
| TIME THRUSTER(S) USED | 2103 SECONDS |
| PROPELLANT TEMPERATURE | 17 |
| PHOTOVOLTAIC EFFECTIVENESS | 97% |
| STATE OF CHARGE | 77% |
| TOTAL CHARGE CYCLES | 339 |
| PAYLOAD STATUS | NOMINAL |
| REACTION WHEEL SATURATIONS | (11%,9%,37%) |
| SINGLE EVENT UPSET COUNT | 7 |
| ... | ... |

STATE DATA 378

| PARAMETER 502 | VALUE 504 |
|---|---|
| SATELLITE IDENTIFIER | 2731 |
| MODEL/BLOCK | 32/5 |
| SATELLITE OVERALL METRIC | 177 |
| PAYLOAD METRIC | 247 |
| MANEUVERING SYSTEM METRIC | 127 |
| ... | ... |

FIG. 5A

AUTOMATED LIMIT DATA 382

| PARAMETER 502 | VALUE 504 |
| --- | --- |
| MAX DELTA V PER MANEUVER | 1.5 M/S |
| MAX CONCURRENT MANEUVERS | 195 |
| MAX ADJACENT MANEUVERS | 3 |
| MIN VARIANCE TO MANEUVER | 205 M |
| MAX ACTIVITIES TO SATS/TIME | 75/HOUR |
| MIN ALTERNATE INPUTS TO ACT | 2 |
| ORIENTATION CHANGE < | 15 DEG |
| MAX POWER CONSUMED | 250 WATTS |
| ... | ... |

OPERATOR LIMIT DATA 364
(e.g. operator approval required)

| PARAMETER 502 | VALUE 504 |
| --- | --- |
| DELTA V PER MANEUVER > | 1.5 M/S |
| EST. FINAL PROPELLENT < | 100 GRAMS |
| LEAVE ASSIGNED ORBITAL VOLUME | YES |
| CHANGE ORBITAL PLANE | YES |
| DEORBIT | YES |
| ... | ... |
| | |

FIG. 5B

Event Data 402

| Parameter 502 | Value 504 |
| --- | --- |
| Event Identifier | 5684156884 |
| Satellite Identifier | 1492 |
| Event Type | Payload Orientation Out of Limit |
| Timing Type | Predicted Time |
| Time associated with event | 202105181207.6 |
| ... | ... |

Activity Data 412

| Parameter 502 | Value 504 |
| --- | --- |
| Satellite Identifier | 1492 |
| Activity Category | Reorient Satellite for Payload |
| Execute by (time) | not specified |
| Complete by (time) | 202105181207.6 |
| ... | ... |
| | |

Prioritization Data 416

| Parameter 502 | Value 504 |
| --- | --- |
| Activity Category | Reorient Satellite for Payload |
| Execute by (time) < Threshold | Yes |
| Priority | 115 |
| ... | ... |

FIG. 5C

Activity Alternative Data 418

| Parameter 502 | Value 504 | Sat Cost Value 506 | Payload Cost Value 508 |
|---|---|---|---|
| Activity Category | Reorient Satellite for Payload | - | - |
| Alternative Activity | None - drift | 10 | 255 |
| Alternative Activity | Service different geo-area | 5 | 145 |
| Alternative Activity | Reorient using propulsion | 205 | 127 |
| Alternative Activity | Reorient using magnetorquer | 65 | 75 |
| Alternative Activity | Reorient using reaction wheel | 179 | 35 |
| ... | ... | .. | ... |

Activity Set Data 420

| Parameter 502 | Value 504 |
|---|---|
| Activity | Operate magnetorquer |
| Complete by (time) | 202105181207.6 |
| Activity | Battery maintenance - cycle |
| Complete by (time) | 202105190000.0 |
| Activity | PV Actuator Exercise |
| Complete by (time) | 202105190000.0 |
| ... | ... |

FIG. 5D

Proposed Plan data 384

| Parameter 502 | Value 504 |
|---|---|
| Satellite Identifier | 2002 |
| Priority | 77 |
| Execute by (time) | 202105181057.5 |
| Complete by (time) | 202105181137.1 |
| Maneuver Involved? | YES |
| Activity Category | Reorient Satellite for Payload |
| Satellite system(s) used | magnetorquer |
| Expected to leave assigned vol? | NO |
| Action Details | 5a 4d 61 67 54 6f 72 71 33 37 |
| ... | ... |

Actual Plan Data 392

| Parameter 502 | Value 504 |
|---|---|
| Satellite Identifier | 2002 |
| Priority | 85 |
| Execute at (time) | 202105181031.2 |
| Window (time in seconds) | 637 |
| Maneuver Involved? | YES |
| 1st Activity Category | Reorient Satellite for Payload |
| 1st Satellite system(s) used | magnetorqurer |
| Expected to leave assigned box? | NO |
| 1st Action Details | 6d 6f 76 65 20 71 75 69 63 6b |
| 2nd Activity Category | PV Actuator Exercise |
| 2nd Satellite system(s) used | PV actuators 1 and 2, battery |
| 2nd Action Details | 77 69 67 67 6c 65 70 76 0a |
| ... | ... |

FIG. 5E

SYSTEM TO MANAGE CONSTELLATION OF SATELLITES

BACKGROUND

A constellation of a large number of satellites, and the payloads carried by those satellites, may be used to provide various services. The constellation is managed to maintain safety and efficacy.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIGS. 5A-5E illustrate data associated with operation of the system, according to some implementations.

Figure 1:
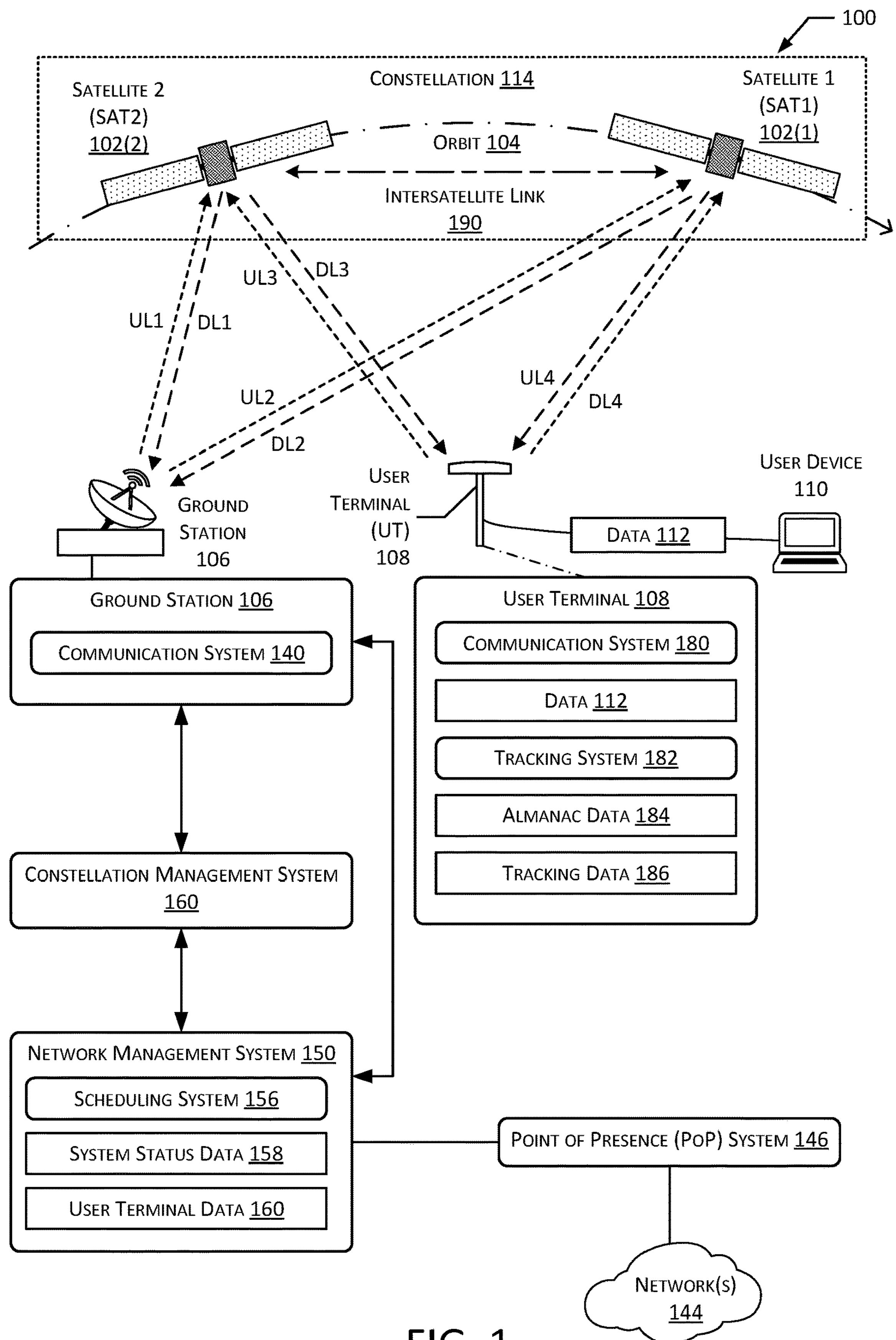
FIG. 1 illustrates a system that utilizes a constellation management system (CMS) for a constellation of satellites, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A constellation of many satellites may be used to provide a wide variety of useful services. For example, a communication system may utilize satellites in the constellation to wirelessly transfer data between user terminals and ground stations that in turn connect to other networks, such as the Internet. In another example, a remote sensing system may utilize satellites in a constellation to acquire remote sensing data for weather forecasting or terrestrial resource management.

Traditionally, operators of individual satellites have manually managed their satellites. Manual management is time and labor intensive, costly, and may be slow to respond to dynamic events. Manual management does not scale well, and rapidly becomes infeasible as the number of satellites managed increases. For example, while traditional organizations may be able to manually manage a relatively small constellation of 70 satellites, managing 700 satellites in such fashion is infeasible and may adversely impact safety and efficiency of the constellation as well as other resources that are in orbit.

Described in this disclosure is a constellation management system (CMS) that facilitates operation of satellite constellations. The CMS acquires and uses data from a variety of sources to maintain situational awareness of the orbital environment and the constellation. The CMS may accept as input space situation awareness data that comprises information about objects in orbit, such as obtained from other operators of other satellites, radar tracking, and so forth. The CMS may accept as input space weather data that is indicative of space weather. For example, the space weather data may be indicative of solar storms, geomagnetic storms, and so forth. The CMS accepts as input telemetry data from satellites in the constellation. For example, the telemetry data may include information about the satellite as well as position data obtained from global satellite navigation system (GNSS) receivers onboard individual satellites. The CMS may also accept as input navigation status data about the GNSS being used to provide position data. For example, the navigation status data may be indicative as to changes in reliability of the signals emitted by the GNSS.

Various events may occur that involve one or more satellites in the constellation. These may include, but are not limited, a predicted or actual deviation in position of a satellite from an assigned orbit that exceeds a threshold value, a telemetry value associated with a component onboard a satellite that is outside of a specified range, a potential radio interference event such as another satellite passing through the radio frequency "volume" of a payload on a satellite in the constellation, expiration of time since last evaluation of the satellite, and so forth. These events may require that some action be taken.

The CMS uses the information ingested to determine a proposed plan. An event may be associated with several alternative activities. For example, an event of "payload orientation out of limit" may have several alternative activities such as doing nothing, using another satellite to provide service, or various options to reorient the satellite using different systems. Costs may be associated with these alternative activities. These costs may be representative of various factors such as current battery state, estimated battery discharge, estimated propellant consumption, time to complete, and so forth. Based on the cost, a particular alternative activity may be selected and used to generate a proposed plan.

Other pending activities that are associated with the satellite may also be retrieved. For example, routine maintenance operations that are not time sensitive may be retrieved. Pending activities that do not conflict, may be combined to generate a proposed plan that includes more than one activity.

The proposed plan may then be assessed to determine if any of the proposed activities exceed automated oversight limits. For example, governors or limits may be set to limit automated maneuvers that have a maximum delta v (change in velocity) that exceeds 1.5 meters per second (m/s), or would consume more than some specified quantity of propellant.

In some situations, proposed plans may be provided to external systems. For example, information about a proposed orbit resulting from a proposed maneuver may be provided to an external space situation awareness (SSA) provider. The SSA may accept the information about the proposed orbit and determine if a conjunction with tracked objects is likely to occur within a specified interval of time. The SSA may provide response data to the system, such as an indication that no conjunction is deemed likely. The system may take the response data into consideration, and subsequently determines commands to operate the satellite to perform the activities specified. The commands are sent to the satellite that executes those commands to perform the activities.

During typical operation the CMS operates without human intervention. A human may be consulted to confirm a proposed plan that exceeds the automated oversight limits, is designated for operator confirmation, and so forth. In addition to managing individual satellites, the CMS maintains awareness of the constellation as a whole and may request human oversight for activities that may involve many satellites. For example, while an individual proposed plan to maneuver a particular satellite may be within the automated oversight limits, if the count of satellites in the constellation that have proposed concurrent maneuvers exceeds a threshold count, a human may be notified and asked to confirm those maneuvers.

The CMS may provide various levels of involvement. For example, a first event indicative of a predicted conjunction event in 10 days may be handled automatically. Continuing the example, a second event indicative of a predicted conjunction event in six hours may result in the immediate generation of a proposed plan that is promptly presented to a human operator for confirmation.

The CMS may include one or more machine learning systems. These machine learning systems may be trained based at least in part on human input. For example, the training data may comprise event data, state data of the satellite, ephemeris data, a set of alternative activities, and the activity ultimately selected by a human operator. Once trained, the machine learning systems may provide various functions such as predicting failures, providing improved recommendations for activities to address various situations, and automatically initiating activities.

The CMS also reduces the capital costs associated with the constellation by managing usage of resources onboard the satellite, such as battery systems and maneuvering systems. For example, the CMS may moderate activities that use various resources onboard individual satellites to avoid depleting the battery and propellant of a single satellite. As a result, operational life of the individual satellite may be extended, reducing the need for replacement or refurbishment.

By using the techniques described in this disclosure, the safe and effective management of a constellation becomes possible. The automation provided by the CMS handles routine events, and over time learns to deal with less common events. The CMS is able to manage complex inputs and quickly determine and implement plans to perform activities that maintain the constellation and perform the mission(s) associated with the payload of the satellites in the constellation.

Illustrative System

A constellation of satellites may be used to provide a wide variety of useful services. For example, a constellation of satellites may include sensors to acquire remote sensing data to facilitate terrestrial resource management. In another example, a constellation of satellites may provide communication services. The ability to communicate between two or more locations that are physically separated provides substantial benefits. Communications over areas ranging from counties, states, continents, oceans, and the entire planet are used to enable a variety of activities including health and safety, logistics, remote sensing, interpersonal communication, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed. Electromagnetic signals will also experience some spreading or dispersion. Just as ripples in a pond will spread out, a radio signal or a spot of light from a laser will spread out at progressively larger distances.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

Building, launching, and operating a satellite is costly. Traditionally, geosynchronous satellites have been used for broadcast and communication services because they appear stationary to users on or near the Earth and they can cover very large areas. This simplifies the equipment needed by a station on or near the ground to track the satellite.

However, there are limits as to how many geosynchronous satellites may be provided. For example, the number of "slots" or orbital positions that can be occupied by geosynchronous satellites are limited due to technical requirements, regulations, treaties, and so forth. It is also costly in terms of fuel to place a satellite in such a high orbit, increasing the cost of launching the satellite.

The high altitude of the geosynchronous satellite can introduce another problem when it comes to sharing electromagnetic spectrum. The geosynchronous satellite can "see" so much of the Earth that special antennas may be needed to focus radio signals to particular areas, such as a particular portion of a continent or ocean, to avoid interfering with radio services on the ground in other areas that are using the same radio frequencies.

Using a geosynchronous satellite to provide communication services also introduces a significant latency or delay because of the time it takes for a signal to travel up to the satellite in geosynchronous orbit and back down to a device on or near the ground. The latency due to signal propagation time of a single hop can be at least 240 milliseconds (ms).

To alleviate these and other issues, satellites in NGOs may be used. The altitude of an NGO is high enough to provide coverage to a large portion of the ground, while remaining low enough to minimize latency due to signal propagation time. For example, the satellite at 600 km only introduces 4 ms of latency for a single hop. The lower altitude also reduces the distance the electromagnetic signal has to travel. Compared to the geosynchronous orbit, the reduced distance of the NGO reduces the dispersion of electromagnetic signals. This allows the satellite in NGO as well as the device communicating with the satellite to use a less powerful transmitter, use smaller antennas, and so forth.

The system 100 shown here comprises a plurality (or "constellation" 114) of artificial satellites 102(1), 102(2), . . . , 102(S), each satellite 102 being in orbit 104 around a body such as the Earth, moon, sun, and so forth. Also shown is a ground station 106, user terminal (UTs) 108, a user device 110, and so forth.

The constellation 114 may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104. The satellite 102 is discussed in more detail with regard to FIG. 2.

One or more ground stations 106 comprise facilities that are in communication with one or more satellites 102. The ground stations 106 may pass data between the satellites 102, a network management system 150, networks such as the Internet, and so forth. The ground stations 106 may be emplaced on land, on vehicles, at sea, and so forth. Each ground station 106 may comprise a communication system 140. Each ground station 106 may use the communication system 140 to establish communication with one or more satellites 102, other ground stations 106, and so forth. The ground station 106 may also be connected to one or more communication networks. For example, the ground station 106 may connect to a terrestrial fiber optic communication network. The ground station 106 may act as a network gateway, passing user data or other data between the one or more communication networks and the satellites 102. Such data may be processed by the ground station 106 and communicated via the communication system 140. The communication system 140 of a ground station 106 may include components similar to those of the communication system of a satellite 102 and may perform similar communication functionalities. For example, the communication system 140 may include one or more modems, digital signal processors, power amplifiers, antennas (including at least one antenna that implements multiple antenna elements, such as a phased array antenna), processors, memories, storage devices, communications peripherals, interface buses, and so forth.

The satellites 102 are in communication with a constellation management system (CMS) 160 that facilitates management of the satellites 102 in the constellation 114. The CMS 160 may coordinate and direct operation of the satellites 102 in the constellation 114. For example, the CMS 160 may monitor and maintain satellites 102 in their assigned orbits, initiate maintenance activities onboard the satellites 102, provide instructions to prevent a payload on a satellite 102 from interfering with another satellite, and so forth. The CMS 160 may comprise one or more servers or other computing devices. Operation of the CMS 160 is discussed in more detail with regard to FIGS. 3-9.

The ground stations 106 are in communication with a network management system 150 that may include a scheduling system 156. The network management system 150 is also in communication, via the ground stations 106, with the satellites 102 and the UTs 108. The network management system 150 coordinates operation of the ground stations 106, UTs 108, and other resources of the system 100. The network management system 150 may interact with the CMS 160 during operation. The network management system 150 may comprise one or more servers or other computing devices.

The scheduling system 156 schedules resources to provide communication to the UTs 108. For example, the scheduling system 156 may determine handover data that indicates when communication is to be transferred from the first satellite 102(1) to the second satellite 102(2). Continuing the example, the scheduling system 156 may also specify communication parameters such as frequency, timeslot, and so forth. During operation, the scheduling system 156 may use information such as ephemeris data from the CMS 160, communication system status data 158, user terminal data 160, and so forth.

The system status data 158 may comprise information such as which UTs 108 are currently transferring data, satellite availability, current satellites 102 in use by respective UTs 108, capacity available at particular ground stations 106, diagnostic information, and so forth. For example, the satellite availability may comprise information indicative of satellites 102 that are available to provide communication service or those satellites 102 that are unavailable for communication service. Continuing the example, the CMS 160 may indicate that a satellite 102 is unavailable due to malfunction, previous tasking, maneuvering, and so forth. The communication system status data 158 may be indicative of past status, predictions of future status, and so forth. For example, the communication system status data 158 may include information such as projected data traffic for a specified interval of time based on previous transfers of user data. In another example, the communication system status data 158 may be indicative of future status, such as a satellite 102 being unavailable to provide communication service due to scheduled maneuvering, scheduled maintenance, scheduled decommissioning, and so forth.

The user terminal data 160 may comprise information such as a location of a particular UT 108. The user terminal data 160 may also include other information such as a priority assigned to user data associated with that UT 108, information about the communication capabilities of that particular UT 108, and so forth. For example, a particular UT 108 in use by a business may be assigned a higher priority relative to a UT 108 operated in a residential setting. Over time, different versions of UTs 108 may be deployed, having different communication capabilities such as being able to operate at particular frequencies, supporting different signal encoding schemes, having different antenna configurations, and so forth.

The UT 108 includes a communication system 180 to establish communication with one or more satellites 102. The communication system 180 of the UT 108 may include components similar to those of the communication system 212 of a satellite 102 and may perform similar communication functionalities. For example, the communication system 180 may include one or more modems, digital signal processors, power amplifiers, antennas (including at least one antenna that implements multiple antenna elements, such as a phased array antenna), processors, memories, storage devices, communications peripherals, interface buses, and so forth. The UT 108 passes communication system status data 158 between the constellation of satellites 102 and the user device 110. The 112 data may include data originated by the user device 110 (upstream data) or data addressed to the user device 110 (downstream data).

The UT 108 may be fixed or in motion. For example, the UT 108 may be used at a residence or on a vehicle such as a car, boat, aerostat, drone, airplane, and so forth. The UT 108 includes a tracking system 182. The tracking system 182 uses almanac data 184 to determine tracking data 186. The almanac data 184 provides information indicative of orbital elements of the orbit 104 of one or more satellites 102. For example, the CMS 160 may generate almanac data 184 that comprises orbital elements such as "two-line element" data for the satellites 102 in the constellation 114. The almanac data 184 may be broadcast or otherwise sent to the UTs 108 using the communication system 180.

The tracking system 182 may use the current location of the UT 108 and the almanac data 184 to determine the tracking data 186 for the satellite 102. For example, based on the current location of the UT 108 and the predicted position and movement of the satellites 102, the tracking system 182 is able to calculate the tracking data 186. The tracking data 186 may include information indicative of azimuth, elevation, distance to the second satellite, time of flight correction, or other information associated with a specified time. The determination of the tracking data 186 may be ongoing. For example, the first UT 108 may determine tracking data 186 every 100 ms, every second, every five seconds, or at other intervals.

With regard to FIG. 1, an uplink is a communication link which allows data to be sent to a satellite 102 from a ground station 106, UT 108, or device other than another satellite 102. Uplinks are designated as UL1, UL2, UL3 and so forth. For example, UL1 is a first uplink from the ground station 106 to the second satellite 102(2). In comparison, a downlink is a communication link which allows data to be sent from the satellite 102 to a ground station 106, UT 108, or device other than another satellite 102. For example, DL1 is a first downlink from the second satellite 102(2) to the ground station 106. The satellites 102 may also be in communication with one another. For example, an intersatellite link (ISL) 190 provides for communication between satellites 102 in the constellation 114.

A device, such as a server, uses one or more networks 144 to send downstream data 112 that is addressed to a UT 108 or a user device 110 that is connected to the UT 108. The system 100 may include one or more point of presence (PoP) systems 146. Each PoP system 146 may comprise one or more servers or other computing devices at a facility, such as on Earth. Separate PoP systems 146 may be located at different locations in different facilities. In one implementation, a PoP system 146 may be associated with providing service to a plurality of UTs 108 that are located in a particular geographic region.

In this illustration, a first PoP system 146 at a facility accepts the data 112 addressed to the UT 108 and proceeds to attempt delivery of the data 112 to the UT 108. The PoP system 146 is in communication with one or more ground stations 106(1), 106(2), . . . , 106(G) and the network management system 150. In some implementations one or more functions may be combined. For example, the PoP system 146 may perform one or more functions of the network management system 150. In another example, the PoP system 146 may include an integrated ground station 106.

The PoP system 146 may provide several functions including determining timeslot and communication resources, generating preshaped data, and so forth. One function is to assign a targeted timeslot to the downstream data 112. For example, scheduling handoffs of UTs 108 from one satellite 102 to another may be scheduled on 5-second intervals. The targeted timeslot may indicate a particular 5-second interval within which the downstream data 112 is expected to be delivered. The targeted timeslot may already be in progress. For example, the targeted timeslot assigned to the downstream data 112 may have begun 3 seconds before the downstream data 112 was received.

The PoP system 146 determines the UT 108 that the downstream data 112 is addressed to and determines first communication resource data. The first communication resource data specifies the communication resources, such as ground station 106, uplink modem at the ground station 106, satellite, downlink modem on the satellite, and so forth that would result in delivery of the downstream data 112 to the UT 108. The downstream data 112 may comprise a single packet or other unit of data transfer, or a plurality of packets or other units of data transfer that are associated with delivery to the particular UT 108.

The satellite 102, the ground station 106, the user terminal 108, the user device 110, the network management system 150, the CMS 160, or other systems described herein may include clocks. These clocks may be synchronized to a common source. In some implementations the clock may be a global positioning system (GPS) disciplined clock or an atomic clock that provides a high accuracy and high precision time source. Output from the clock may be used to coordinate operation of the system 100.

Various configurations of the systems described in this disclosure may be used. For example, the CMS 160 may be distributed across a plurality of data centers to improve reliability and system availability.

The satellite 102, the ground station 106, the user terminal 108, the user device 110, the PoP system 146, the network management system 150, the CMS 160, or other systems described herein may include one or more computer devices or computer systems comprising one or more hardware processors, computer-readable storage media, and so forth. For example, the hardware processors may include application specific integrated circuits (ASICs), field-programmable gate arrays (FPGAs), digital signal processors (DSPs), and so forth. Embodiments may be provided as a software program or computer program including a non-transitory computer-readable storage medium having stored thereon instructions (in compressed or uncompressed form) that may be used to program a computer (or other electronic device) to perform the processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Figure 2:
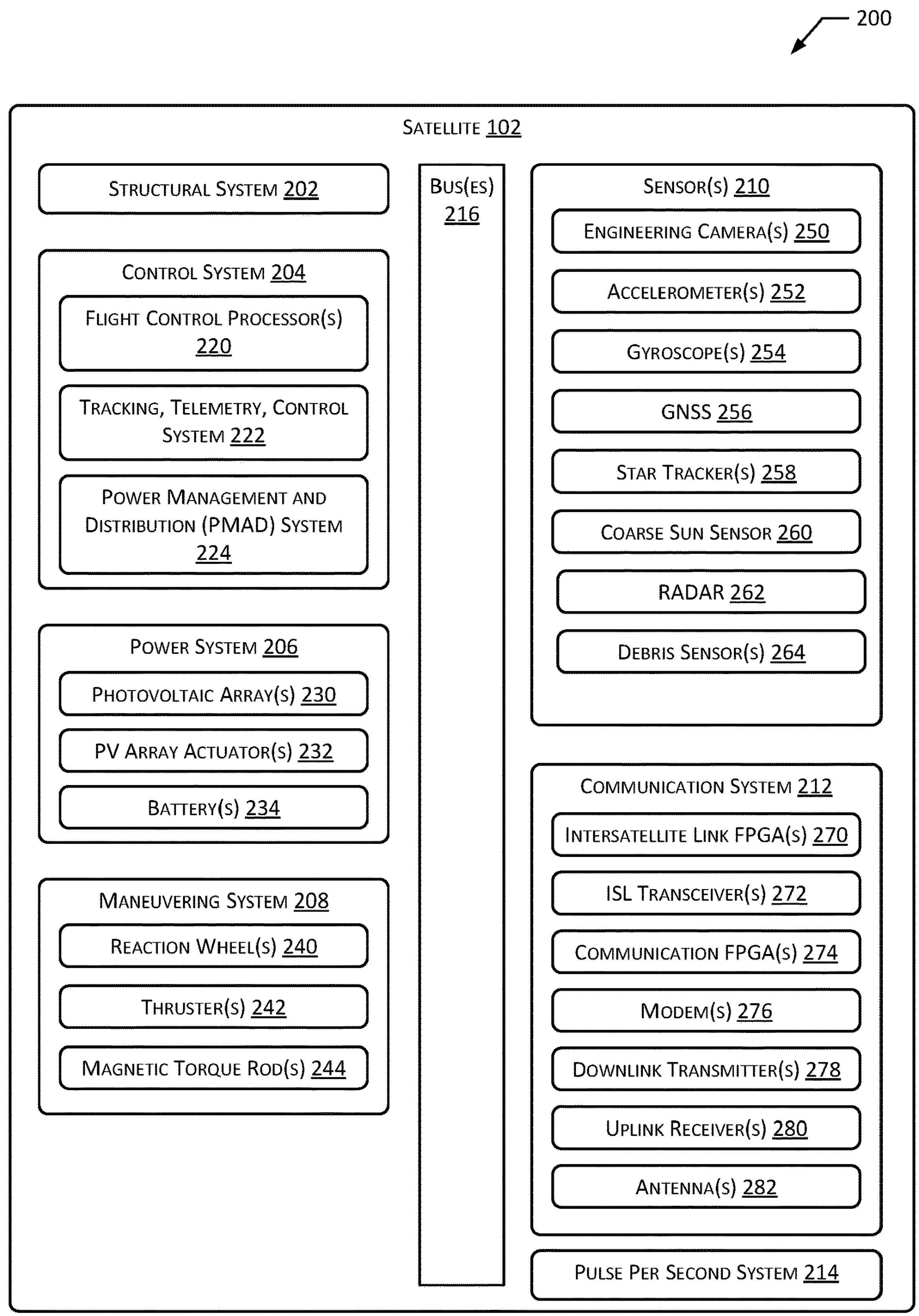
FIG. 2 is a block diagram of some systems associated with the satellite, according to some implementations.

FIG. 2 is a block diagram 200 of some systems associated with the satellite 102, according to some implementations. The satellite 102 may comprise a structural system 202, a control system 204, a power system 206, a maneuvering system 208, one or more sensors 210, and a communication system 212. A pulse per second (PPS) system 214 may be used to provide timing reference to the systems onboard the satellite 102. One or more busses 216 may be used to transfer data between the systems onboard the satellite 102. In some implementations, redundant busses 216 may be provided. The busses 216 may include, but are not limited to, data busses such as Controller Area Network Flexible Data Rate (CAN FD), Ethernet, Serial Peripheral Interface (SPI), and so forth. In some implementations the busses 216 may carry other signals. For example, a radio frequency bus may comprise coaxial cable, waveguides, and so forth to transfer radio signals from one part of the satellite 102 to another. In other implementations, some systems may be omitted or other systems added. One or more of these systems may be communicatively coupled with one another in various combinations.

The structural system 202 comprises one or more structural elements to support operation of the satellite 102. For example, the structural system 202 may include trusses, struts, panels, and so forth. The components of other systems may be affixed to, or housed by, the structural system 202. For example, the structural system 202 may provide mechanical mounting and support for solar panels in the power system 206. The structural system 202 may also provide for thermal control to maintain components of the satellite 102 within operational temperature ranges. For example, the structural system 202 may include louvers, heat sinks, radiators, and so forth.

The control system 204 provides various services, such as operating the onboard systems, resource management, providing telemetry, processing commands, and so forth. For example, the control system 204 may direct operation of the communication system 212. The control system 204 may include one or more flight control processors 220. The flight control processors 220 may comprise one or more processors, FPGAs, and so forth. A tracking, telemetry, and control (TTC) system 222 may include one or more processors, radios, and so forth. For example, the TTC system 222 may comprise a dedicated radio transmitter and receiver to receive commands from a ground station 106, send telemetry to the ground station 106, and so forth. A power management and distribution (PMAD) system 224 may direct operation of the power system 206, control distribution of power to the systems of the satellite 102, control battery 234 charging, and so forth.

The power system 206 provides electrical power for operation of the components onboard the satellite 102. The power system 206 may include components to generate electrical energy. For example, the power system 206 may comprise one or more photovoltaic arrays 230 comprising a plurality of photovoltaic cells, thermoelectric devices, fuel cells, and so forth. One or more PV array actuators 232 may be used to change the orientation of the photovoltaic array(s) 230 relative to the satellite 102. For example, the PV array actuator 232 may comprise a motor. The power system 206 may include components to store electrical energy. For example, the power system 206 may comprise one or more batteries 234, fuel cells, and so forth.

The maneuvering system 208 maintains the satellite 102 in one or more of a specified orientation or orbit 104. For example, the maneuvering system 208 may stabilize the satellite 102 with respect to one or more axes. In another example, the maneuvering system 208 may move the satellite 102 to a specified orbit 104. The maneuvering system 208 may include one or more of reaction wheel(s) 240, thrusters 242, magnetic torque rods 244, solar sails, drag devices, and so forth. The thrusters 242 may include, but are not limited to, cold gas thrusters, hypergolic thrusters, solid-fuel thrusters, ion thrusters, arcjet thrusters, electrothermal thrusters, and so forth. During operation, the thrusters 242 may expend propellent. For example, an electrothermal thruster may use water as propellent, using electrical power obtained from the power system 206 to expel the water and produce thrust. During operation, the maneuvering system 208 may use data obtained from one or more of the sensors 210.

The satellite 102 includes one or more sensors 210. The sensors 210 may include one or more engineering cameras 250. For example, an engineering camera 250 may be mounted on the satellite 102 to provide images of at least a portion of the photovoltaic array 230. Accelerometers 252 provide information about acceleration of the satellite 102 along one or more axes. Gyroscopes 254 provide information about rotation of the satellite 102 with respect to one or more axes. The sensors 210 may include a global navigation satellite system (GNSS) 256 receiver, such as a Global Positioning System (GPS) receiver, to provide information about the position of the satellite 102 relative to Earth. In some implementations the GNSS 256 may also provide information indicative of velocity, orientation, and so forth. One or more star trackers 258 may be used to determine an orientation of the satellite 102. A coarse sun sensor 260 may be used to detect the sun, provide information on the relative position of the sun with respect to the satellite 102, and so forth. A radar 262 may be used to provide information such as distance and bearing to objects. For example, the radar 262 may be used to determine the presence of objects in nearby orbits. In other implementations other sensors may be used, such as LIDAR, optical time of flight devices, cameras, and so forth. For example, a camera may be used to determine occlusion by an object of one or more stellar light sources, such as distance stars. Image data provided by the camera may be processed to determine an approximate distance and bearing of the object. A debris sensor 264 may be used to detect impacts, such as micrometeoroid impacts, small debris impacts, and so forth. For example, the debris sensor 264 may comprise a microphone, microelectromechanical system, or other device that detects acoustic energy in a chassis of the satellite 102 as a result of an impact. In some implementations the accelerometer(s) 252 may be used to detect impacts. The satellite 102 may include other sensors 210 as well. For example, the satellite 102 may include a horizon detector, lidar, and so forth.

The communication system 212 provides communication with one or more other devices, such as other satellites 102, ground stations 106, user terminals 108, and so forth. The communication system 212 may include one or more modems 276, digital signal processors, power amplifiers, antennas (including at least one antenna that implements multiple antenna elements, such as a phased array antenna) 282, processors, memories, storage devices, communications peripherals, interface buses, and so forth. Such components support communications with other satellites 102, ground stations 106, user terminals 108, and so forth using radio frequencies within a desired frequency spectrum. The communications may involve multiplexing, encoding, and compressing data to be transmitted, modulating the data to a desired radio frequency, and amplifying it for transmission. The communications may also involve demodulating received signals and performing any necessary de-multiplexing, decoding, decompressing, error correction, and formatting of the signals. Data decoded by the communication system 212 may be output to other systems, such as to the control system 204, for further processing. Output from a system, such as the control system 204, may be provided to the communication system 212 for transmission.

Each satellite 102 may use one or more antennas 282 or antenna elements to provide a beam for transmission and reception of radio signals. For example, the satellite 102 may have a phased array antenna that allows for gain in a particular direction. Compared to a non-directional radiator, this gain directs the energy of transmitted radio frequency signals in that particular direction. This increases the strength of the signal at a receiver in the UT 108, ground station 106, and so forth. Likewise, the gain results in improved received signal strength at the satellite 102.

The beam provided by the satellite 102 may comprise a plurality of subbeams. Subbeams on a satellite 102 may use different frequencies, timeslots, and so forth, to communicate with the UT 108. Each subbeam provides coverage of a particular geographic area or “footprint”. Compared to a single beam, subbeams provide several advantages. For example, by using subbeams, radio frequencies may be reused by the same satellite 102 and other satellites 102 to service different areas. This allows increased density of UTs 108 and bandwidth.

During a pass over of a particular location on the Earth, each subbeam may be targeted to a geographic location on the Earth. While that target geographic location is in range of the satellite 102, the subbeam tracks the target location. As the satellite 102 moves in orbit 104, the boundary of the footprint may change due to the relative angle between the satellite 102 and the Earth. For example, the footprint boundary may change from approximately an oval shape while the satellite 102 is low on the horizon relative to the target location, a circular shape while directly overhead, then an oval shape as the satellite 102 nears the opposite horizon. As the satellite 102 moves, a subbeam may be retargeted to another target location. In this configuration, instead of the subbeam sweeping along the ground track of the satellite 102, the subbeam loiters on a first area relative to the Earth, then is redirected to a second area.

In some implementations, a particular modem 276 or set of modems 276 may be allocated to a particular subbeam. For example, a first modem 276(1) provides communication to UTs 108 in a first geographic area using a first subbeam while a second modem 276(2) provides communication to UTs 108 in a second geographic area using a second subbeam.

The communication system 212 may include hardware to support the intersatellite link 190. For example, an intersatellite link FPGA 270 may be used to modulate data that is sent and received by an ISL transceiver 272 to send data between satellites 102. The ISL transceiver 272 may operate using radio frequencies, optical frequencies, and so forth.

A communication FPGA 274 may be used to facilitate communication between the satellite 102 and the ground stations 106, UTs 108, and so forth. For example, the communication FPGA 274 may direct operation of a modem 276 to modulate signals sent using a downlink transmitter 278 and demodulate signals received using an uplink receiver 280. The satellite 102 may include one or more antennas 282. For example, one or more parabolic antennas may be used to provide communication between the satellite 102 and one or more ground stations 106. In another example, a phased array antenna 282 may be used to provide communication between the satellite 102 and the UTs 108.

Figure 3:
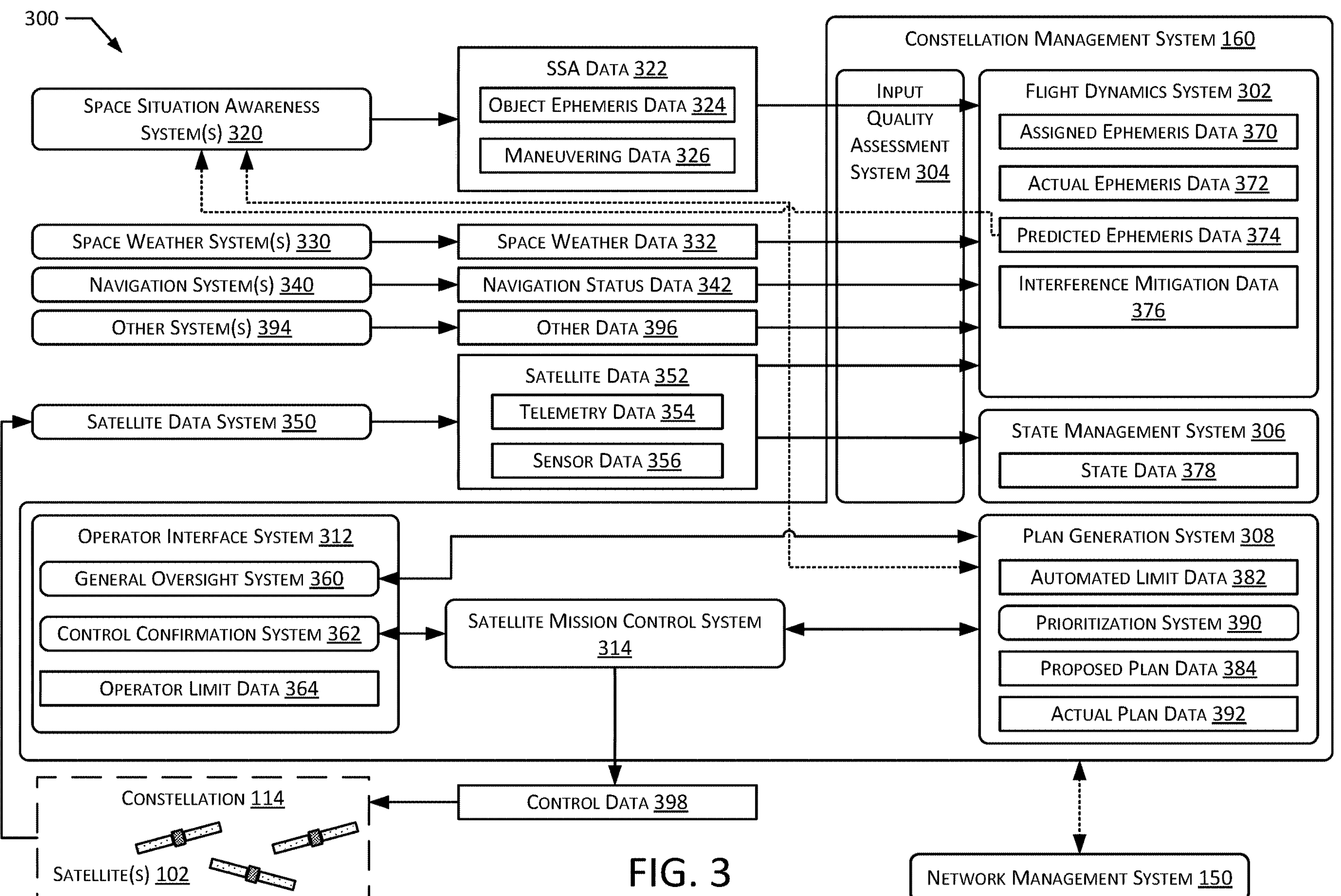
FIG. 3 illustrates the CMS and associated systems, according to some implementations.

FIG. 3 illustrates at 300 the CMS 160 and associated systems, according to some implementations. The CMS 160 may provide various services that include receiving information from external systems, providing information to those external systems, coordinating with those external systems, planning and initiating activities that include satellites 102 in the constellation 114, coordinating with the network management system 150 to facilitate operation of the payloads on the satellites 102, and so forth. The space environment is dynamic and complex, involving many factors that are outside of our daily experience here on Earth. One factor is the number of objects that are in orbit 104 around the Earth. There are over 25,000 objects in Earth orbit that are being tracked. These objects include active satellites, decommissioned satellites, expended rocket boosters, lost tools, and so forth. Some of these objects are under active control, such as satellites that have functional control and maneuvering systems, while other objects are no longer under active control.

Objects that are in orbit around a body such as the Earth experience a variety of effects that change or “perturb” their orbits. These effects are internal and external. Internal effects can include intentional maneuvers using devices such as thrusters, solar sails, interaction with Earth’s magnetic field, and so forth. Internal effects can include outgassing, thermal radiation of satellite components, pressure vessel failures, battery failures, and so forth. External effects include interactions between the object and the various gravitational fields experienced in Earth orbit, Earth’s atmosphere, Earth’s magnetosphere, solar activity, collisions with other objects, and so forth.

The CMS 160 may include various systems, such as a flight dynamics system 302, an input quality assessment system 304, a state management system 306, a plan generation system 308, a satellite mission control (SMC) system 314, an operator interface system 312, and so forth. The CMS 160 may also interact with the network management system 150.

The flight dynamics system (FDS) 302 acquires and processes information that affects the location of satellites 102 in the constellation 114. Ephemeris data comprises information about orbital elements that are descriptive of the orbit 104 of a particular object, such as a satellite 102. These orbital elements may include an epoch or reference time, distance of a semi-major axis, eccentricity, right ascension at reference time, and so forth. The FDS 302 may maintain one or more of assigned ephemeris data 370, actual ephemeris data 372, or predicted ephemeris data 374.

The assigned ephemeris data 370 is indicative of the orbital elements that a particular satellite 102 is assigned to maintain to within some threshold. The assigned ephemeris data 370 may be determined manually or automatically. For example, a human operator may specify a particular set of orbital elements that are assigned to the satellite 102. In another example, the FDS 302 may automatically determine the assigned ephemeris data 370 for a particular satellite.

The actual ephemeris data 372 is based on an actual location of the satellite 102. The actual ephemeris data 372 is indicative of a current or previous actual location of the satellite. For example, the actual ephemeris data 372 may be determined based on telemetry data 354 from the satellite 102 that comprises position data. An example of telemetry data 354 is shown in FIG. 5A.

The predicted ephemeris data 374 is a prediction of what the orbital elements of the satellite 102 will be. The predicted ephemeris data 374 may be based on the effects of the various internal effects such as planned maneuvers, external effects such space weather and orbital perturbation models, and so forth.

The FDS 302 may determine interference mitigation data 376 that is indicative of potential interactions between a communication payload on a satellite 102 and other objects including other satellites 102 in the constellation 114. For example, the interference mitigation data 376 may be indicative of, for a specified time, a volume in space within which a radio frequency (RF) transmitted by a payload on a satellite 102 would exceed a specified threshold value. Continuing the example, the FDS 302 may generate interference mitigation data 376 that indicates an RF payload, or at least a portion thereof, of a particular satellite 102 should be deactivated during a specified time interval to avoid interfering with another satellite 102. This is discussed in more detail with regard to FIGS. 8-9.

Various systems may interact with the CMS 160. One or more space situation awareness (SSA) systems 320 may provide SSA data 322 to the CMS 160. The SSA data 322 may comprise object ephemeris data 324, maneuvering data 326, and so forth. For example, the object ephemeris data 324 may comprise orbital two-line elements (TLE) data that may be used to determine a predicted location of an object in space. Continuing the example, the maneuvering data 326 may be indictive of planned or in-progress maneuvers that may change the motion of the object.

An SSA system 320 may be operated by governments, private companies, or other entities. For example, the United States Air Force (USAF) obtains tracking data using various radar and optical tracking resources. A portion of this data is available to others to facilitate orbital operations. For example, orbital elements for various objects in orbit 104 tracked by the USAF may be accessed online at space-track.org. In another example, private companies may generate SSA data 322. For example, commercial services providers may use data from ground based radar sites to generate object ephemeris data 324 for objects in orbit. In another example, operators of other constellations 114 may provide object ephemeris data 324 for satellites 102 under their control.

Space weather systems 330 provide space weather data 332 to the CMS 160. The space weather systems 330 may be operated by governments, private companies, or other entities. For example, the United States National Oceanic and Atmospheric Administration (NOAA) acquires data from various ground-based and satellite-based resources about the sun, Earth's upper atmosphere, Earth's magnetosphere, radiation belts, and so forth. For example, the space weather data 332 may provide information such as movement of the upper atmosphere, energetic particle flux, solar activity, location of the South Atlantic Anomaly, and so forth.

Space weather can substantially affect operation of satellites 102. For example, a coronal mass ejection (CME) from the sun may result in a substantial increase in charged particles that interfere with operation of electronic devices onboard satellites 102. In another example, changes in solar activity cause the atmosphere to change height, changing aerodynamic drag on satellites.

Navigation systems 340 comprising global navigation satellite systems (GNSS) may provide navigation status data 342 to the CMS 160. The navigation systems 340 may be operated by governments, private companies, or other entities. For example, the USAF operates the global positioning system (GPS), Russia operates the Global Navigation Satellite System (GLONASS), and so forth. The satellite portion of the navigation systems 340 is susceptible to the effects of space weather, may experience equipment failures, and so forth. Navigation status data 342 may provide information indicative of operation of the GNSS, accuracy data, correction factors, and so forth. For example, the navigation status data 342 may comprise information that indicates the accuracy of navigational signals provided for a particular volume of space at a particular time. The GNSS 256 receiver onboard the satellites 102 may use signals from the navigation system 340 to determine position data for the satellites 102 in the constellation 114.

Other systems 394 may provide other data 396 to the CMS 160. In one implementation, the other systems 394 may include terrestrial weather data indicative of observed or forecasted terrestrial weather conditions. Terrestrial weather conditions may affect operations involving the satellites 102. For example, heavy precipitation in the atmosphere between the satellite 102 and a UT 108 may attenuate radio signals along a signal path, producing "rain fade". This attenuation may affect communication by resulting in reduced throughput, requiring additional transmit power, and so forth.

In some implementations, the data described herein as provided to the CMS 160 may be provided to the network management system 150. For example, the network management system 150 may use the terrestrial weather data to select which satellites 102 will be used to provide communication service to UTs 108 to minimize attenuation of radio signals along the signal path between a given satellite 102 and UT 108.

The network management system 150 may also provide information for the CMS 160. For example, the network management system 150 may provide information to the CMS 160 about system status data 158, geographic location of UTs 108, diagnostic data, and so forth. The CMS 160 may take this information into consideration while determining proposed plan data 384.

A satellite data system 350 provides satellite data 352 about the satellites 102 in the constellation 114. For example, the satellite data system 350 may receive satellite data 352 from satellites 102 via the ground stations 106. The satellite data 352 may comprise telemetry data 354, sensor data 356, and so forth. The telemetry data 354 may comprise information indicative of the operation of one or more devices onboard the satellite 102. For example, the telemetry data 354 may be indicative of battery charge, propellant quantity, and so forth. The sensor data 356 may comprise data obtained by one or more sensors 210. For example, the sensor data 356 may include position data obtained by the GNSS 256 receiver. In another example, the sensor data 356 may comprise data indicative of objects detected by the radar 262.

The input quality assessment system 304 processes data ingested by the CMS 160 to assess the quality of the data. The input quality assessment system 304 determines quality based on comparisons between different sources of data, based on analysis relative to historical data, by comparing to predefined ranges, or using other techniques. For example, the CMS 160 may compare at least a portion of first object ephemeris data 324 received from a first SSA system 320 to second object ephemeris data 324 received from a second SSA system 320. If the comparison indicates a variation that exceeds a threshold amount, one or both of the first or second object ephemeris data 324 may be disregarded. Data that is determined to have quality less than a threshold may be discarded or flagged during subsequent processing by the CMS 160.

During operation, the FDS 302 may accept as input one or more of the SSA data 322, space weather data 332, navigation status data 342, satellite data 352, and so forth. For example, the FDS 302 may use the navigation status data 342 and the sensor data 356 to determine the actual ephemeris data 372 for a particular satellite 102. In another example, the FDS 302 may use the space weather data 332, and the actual ephemeris data 372 to determine the predicted ephemeris data 374.

The FDS 302 may use the SSA data 322 and the predicted ephemeris data 374 to determine if a conjunction event may occur. A conjunction event may be determined when the locations of a satellite 102 and another object are less than a threshold distance apart at a specified time. In some situations, a conjunction event may involve a collision between the satellite 102 and the object.

During operation, the FDS 302 may also send data to the SSA system(s) 320 or other operators of constellations 114. For example, the FDS 302 may send predicted ephemeris data 374 about the constellation 114 to the SSA system 320. This may reduce operational risks by providing an additional opportunity to determine possible conjunction events in advance. For example, the SSA system 320 may use the predicted ephemeris data 374 to produce an independent determination as to whether a conjunction event may occur. That determination may then be provided back to the CMS 160 or to other systems.

The state management system 306 may maintain state data 378 about satellites 102 in the constellation 114. The state data 378 may include information about the satellite 102, payload, and so forth. An example of state data 378 is shown in FIG. 5A.

In some implementations the state data 378 may include predicted data. For example, the state data 378 may include a prediction of remaining operational lifespan of a particular system onboard the satellite 102. The state management system 306 may determine predicted data using one or more of decision trees, heuristics, machine learning systems, and so forth. For example, the machine learning systems may comprise one or more neural networks. The one or more neural networks may be trained using satellite data 352 to determine a correspondence between particular inputs such as specific values of telemetry data 354 and later values. For example, telemetry data 354 from many satellites 102 may be acquired over time and used to predict performance of a particular system.

The plan generation system 308 interacts with the other systems and uses a prioritization system 390 to determine actual plan data 392 based on proposed plan data 384. The actual plan data 392 may comprise a satellite identifier, priority value indicative of priority of the plan, timing information, information about the systems on the satellite 102 used by the plan, and details about operating those systems. An example of actual plan data 392 is shown in FIG. 5E. Data from other systems, such as from the FDS 302, the state management system 306, operator interface system 312, and so forth may result in determination of an event.

Responsive to the event, the plan generation system 308 determines one or more activities, and from those activities, the proposed plan data 384. For example, as described below with regard to FIG. 4, the prioritization system 390 may assess activity alternatives to determine the proposed plan data 384. The proposed plan data 384 may comprise the satellite identifier, priority value indicative of priority of the proposed plan, timing information, and so forth. The activities described in the proposed plan data 384 may be constrained by one or more values and may be specified by automated limit data 382. For example, the delta v indicated in the proposed plan data 384 for a maneuver generated automatically by the plan generation system 308 may be limited by values specified in the automated limit data 382. The proposed plan data 384 may be evaluated, and if approved, is used to determine actual plan data 392. For example, if values within the proposed plan data 384 are within the limits specified by the automated limit data 382, the proposed plan data 384 may be approved to use as actual plan data 392. In some situations, operator input may be received to confirm the use of the proposed plan data 384 as the actual plan data 392. For example, the proposed plan data 384 may be provided to the operator interface system 312 to receive user input via a user interface.

As mentioned above, the plan generation system 308 may take into consideration data from the network management system 150. For example, during maneuvers the satellite 102 may be unable to operate the payload to provide communication services to a UT 108. The proposed plan data 384 may specify maneuvers for a particular satellite 102 to take place while the satellite 102 is over a portion of the Earth that contains a low number of UTs 108 per area, to reduce the number of UTs 108 that would be affected by the reduction in available communication resources.

The actual plan data 392 may be passed to a satellite mission control system 314. The satellite mission control system 314 may perform one or more functions. In one implementation, the satellite mission control system 314 may confirm that the actual plan data 392 would not result in an adverse event associated with the satellite 102. For example, the satellite mission control system 314 may confirm that an operation involving an update to the onboard computer will not be executed while the satellite 102 is passing through the South Atlantic Anomaly that could result in an upset event to the onboard computer. The satellite mission control system 314 may determine control data 398 comprising one or more commands for the satellite 102 to execute to implement the actual plan data 392. The satellite mission control system 314 may send the control data 398 to the appropriate satellite 102. The satellite 102 then executes the one or more commands in the control data 398. For example, a TTC ground station may be used to send the control data 398 to the satellite 102. The TTC system 222 onboard the satellite 102 may receive and process the control data 398.

In some implementations one or more of the functions described with respect to the plan generation system 308 may be performed at least in part by the SMC system 314. For example, the proposed plan data 384 may be passed to the SMC system 314 that then generates the actual plan data 392.

During operation, the plan generation system 308 may also send data to the SSA system(s) 320 or other operators of constellations 114. For example, the plan generation system 308 may send information about a proposed maneuver that is in proposed plan data 384 to the SSA system 320. This may reduce operational risks by providing an additional opportunity to determine possible conjunction events in advance. For example, the SSA system 320 may use the information about the proposed maneuver and other available information to produce an independent determination as to whether the maneuver is likely to result in a conjunction event. That determination may then be provided back to the plan generation system 308 in the CMS 160 or to other systems. For example, if the SSA 320 confirms the proposed maneuver is not likely to result in a conjunction event, the plan generation system 308 may generate actual plan data 392 that includes the proposed maneuver.

The operator interface system 312 provides functionality allowing other operators, such as human operators or autonomous operators, to interact with the CMS 160. For example, the operator interface system 312 may provide a user interface for a human operator to use. The operator may provide input via the user interface that indicates approval of a proposed plan data 384, changes to the proposed plan data 384, and so forth. A general oversight system 360 may provide various functions such as a “dashboard” or overall status of the constellation 114. The general oversight system 360 may monitor larger scale operations, such as maneuvering a group of satellites 102.

The operator interface system 312 may include a control confirmation system 362. The control confirmation system 362 allows an operator to be introduced into the operational workflow. Operation of the operator interface system 312 may be constrained by operator limit data 364. The operator limit data 364 may specify thresholds as to what activities may be approved by a single operator, which activities require multiple operators, and so forth. For example, the control confirmation system 362 may require approval from two human operators to perform certain activities such as deorbiting a satellite 102. An example of operator limit data 364 is shown in FIG. 5B.

In implementations where the constellation 114 provides communication services, the CMS 160 may interact with the network management system 150 that operates and manages the communication service and associated payload. For example, the FDS 302 may determine interference mitigation data 376 that, relative to a particular location to provide service on Earth, indicates satellite 102(1734) will be within the radio frequency (RF) volume produced by a transmitter on satellite 102(941). To avoid radio frequency interference, responsive to the interference mitigation data 376, the radio transmitter payload on satellite 102(941) may be turned off for the period that satellite 102(1734) will be within the volume.

In another example, some activities may result in a satellite 102 being unavailable to provide communication services. For example, while maneuvering the satellite 102 may be unable to provide communication services to UTs 108. The CMS 160 may provide information to the network management system 150 that is indicative of which satellites 102 are unavailable, and time intervals as to when those satellites 102 will be unavailable.

Additional description of some of the data mentioned above are discussed with regard to FIGS. 5A-5E. For ease of illustration, and not by way of limitation, various protocols to maintain security of the system 100 are not shown. For example, one or more cryptographic techniques may be used to secure the transfer of data between systems, to confirm the origin of data ingested into the CMS 160, and so forth.

The CMS 160 may utilize one or more of decision trees, heuristics, machine learning systems, or other techniques during operation. For example, the machine learning systems may comprise one or more neural networks. The one or more neural networks may be trained using data associated with operation of the system 100. For example, the plan generation system 308 may comprise a neural network that is trained at least in part using actual plan data 392 and associated input data to the CMS 160 that is associated with the determination of the actual plan data 392.

Figure 4:
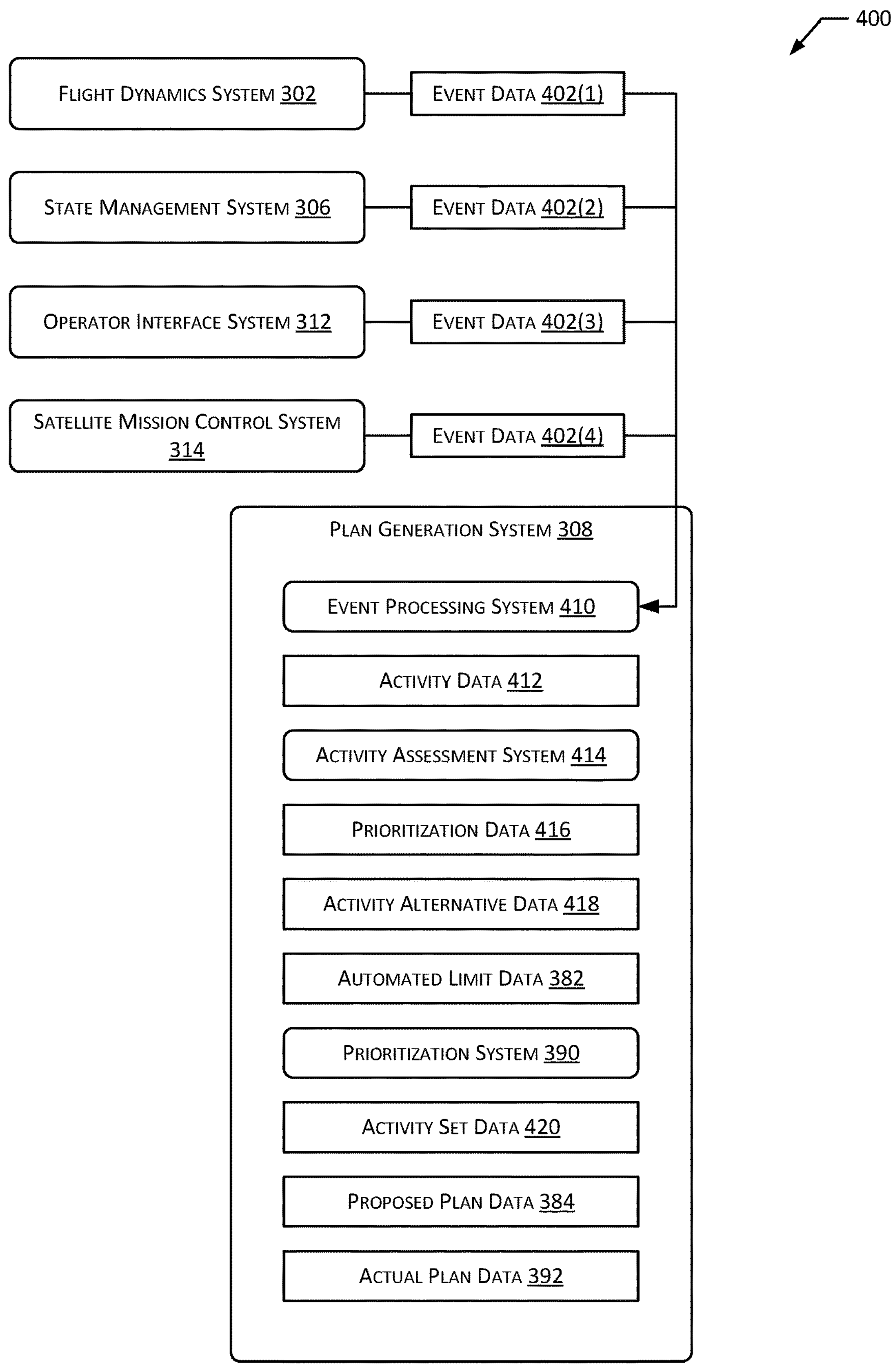
FIG. 4 illustrates a plan generation system of the CMS that is used to determine actual plan data used to operate satellites in the constellation, according to some implementations.

FIG. 4 illustrates the plan generation system 308 of the CMS 160 that is used to determine actual plan data 392 used to operate satellites 102 in the constellation 114, according to some implementations.

Systems within or associated with the CMS 160 may generate event data 402. Event data 402 is indicative of an event or occurrence that is associated with one or more satellites 102 in the constellation 114. An example of event data 402 is shown in FIG. 5C.

The FDS 302 may generate event data 402 that is based on the location or orientation of the satellite 102. For example, if the predicted ephemeris data 374 indicates that the predicted orbit of the satellite 102 will deviate from the assigned orbit indicated by the assigned ephemeris data 370 by more than a threshold value, event data 402 may be generated. Continuing the example, the predicted deviation in position of the satellite 102 exceeding a threshold value may generate event data 402.

The state management system 306 may generate event data 402 that is based on the state data 378 of the satellite 102. The event may be determined by comparing one or more values of the state data 378 with historical values, a specified threshold, specified range, and so forth. For example, if a battery charge value drops below a minimum threshold value or rises above a maximum threshold value, event data 402 may be generated.

The operator interface system 312 may generate event data 402. For example, an operator may generate event data 402 that is indicative of a potential failure in a specified component used in a subset of the satellites 102.

The satellite mission control system 314 may generate event data 402. For example, the satellite mission control system 314 may generate event data 402 indicative of a failure to execute one or more commands in the control data 398.

Other systems may also generate event data 402. In one implementation a scheduler system (not shown) may generate event data 402 upon expiration of a timer, at a specified time, and so forth. For the example, event data 402 may be generated at a specified interval such as every four hours that is indicative of the event to evaluate or check a particular satellite 102. Responsive to the event data 402, the FDS 302 may update predicted ephemeris data 374, interference mitigation data 376, and so forth. Responsive to the event data 402, the state management system 306 may assess satellite health.

The event data 402 is provided to an event processing system 410 of the plan generation system 308. The event processing system 410 may associate particular events with corresponding activity data 412. The activity data 412 may be indicative of an activity category and may include constraints on a resulting activity, such as an "execute by time" or a "complete by time". For example, the FDS 302 may issue event data 402 for a "payload orientation out of limit" event, indicating that at a predicted time the antennas 282 associated with the satellite's 102 downlink will not be pointing in the direction needed to maintain communication service to a specified location on Earth. An example of activity data 412 is shown in FIG. 5C.

The event processing system 410 may determine, responsive to the event data 402, activity data 412 that is indicative of one or more categories of activity. Continuing the earlier example, responsive to the event data 402 of "payload orientation out of limit" the resulting activity data 412 may be indicative of an activity category "reorient satellite for payload" and data indicative of a "complete by time" indicating when the action needs to be completed by.

An activity assessment system 414 may accept the activity data 412 as input and determine prioritization data 416 and activity alternative data 418. The prioritization data 416 associates a priority value with the activity category indicated by the activity data 412. In some implementations, a priority value may be assigned to a particular activity category. In another implementation, the priority value may vary based on one or more factors. For example, as an interval time between current time and the "complete by time" decreases, the priority value may increase. The prioritization data 416 may also indicate whether the activity category is to be executed by a specified time. An example of prioritization data 416 is shown in FIG. 5C.

An activity category may be associated with one or more possible activities. The activity alternative data 418 may provide alternative actions that are associated with a particular activity category. The activity alternative data 418 may also include other information associated with the alternative actions. For example, the activity alternative data 418 may indicate a satellite cost value 506 that is indicative of a cost associated with an activity performed by the satellite 102. An example of activity alternative data 418 is shown in FIG. 5D.

The satellite cost value 506 may be generalized to a cost associated with a particular type of satellite, or may be specific to a particular individual satellite 102. For example, the satellite cost value 506 for a maneuver that involves consumption of propellent may be proportionate to the propellent quantity remaining on a particular satellite 102. As the particular satellite 102 depletes its propellant, the corresponding cost for activities that use the remaining propellant may increase.

The activity alternative data 418 may also associate payload cost values 508 with activities. The payload cost value 508 may be indicative of how the activity will affect operation of the payload. For example, if the payload provides communication services, a low payload cost value 508 may indicate negligible impairment of providing communication service to UTs 108 while a high payload cost value 508 indicates failure to provide communication service to UTs 108.

The automated limit data 382 may specify value(s) that are indicative of constraints placed on activities that are initiated without operator intervention. For example, the automated limit data 382 may specify a maximum delta v per maneuver, maximum number of concurrent maneuvers that are permitted across the constellation 114 or a subgroup thereof, maximum number of adjacent maneuvers, maximum power consumption, and so forth. The automated limit data 382 may govern the automated actions of the system 100. The values of the automated limit data 382 may be determine by an operator, analysis of data, operational limits of the system, and so forth. For example, a threshold count of the maximum number of concurrent maneuvers may be specified by a human operator. In another example, the threshold count of the maximum number of concurrent maneuvers may be determined based on a number of simultaneous maneuvers the satellite mission control system 314 is able to support. An example of automated limit data 382 is shown in FIG. 5B.

Some events indicated by event data 402 may be associated with some activities that are more time sensitive and other activities that are less time sensitive. For example, maneuvers may be highly time sensitive, requiring precise timing. In comparison, maintenance activities such as exercising an actuator may be done anytime within a span of several days. The time sensitivity of these activities may be specified by the prioritization data 416, the activity alternative data 418, and so forth.

The CMS 160 or associated systems may generate event data 402 responsive to other event data 402. For example, an unexpected acceleration of the satellite 102 that is indicated by the satellite data 352 that exceeds a threshold value may result in the state management system 306 generating a first event data 402. Responsive to the first event data 402, the FDS 302 may determine actual ephemeris data 372 and generate a second event data 402 indicative of a deviation from the assigned ephemeris data 370.

The prioritization system 390 of the plan generation system 308 may assess the activity alternative data 418 for pending activities and determine activity set data 420. For example, the prioritization system 390 may select a particular activity from the activity alternative data 418 based on one or more of the satellite cost value 506, payload cost value 508, or other cost values. The prioritization system 390 may select, from the activity alternative data 418, the activity that has the lowest sum of satellite cost value 506 and payload cost value 508. An example of activity alternative data 418 is shown in FIG. 5D.

The activity set data 420 determined by the prioritization system 390 may also specify a sequence or order in which the activities should be performed. Activities may be sequenced based on priority value, complete by times, system dependences, and so forth. For example, activities may be sorted so that activities with earlier complete by times are performed before activities with later complete by times. In another example, the activity "charge batteries" may supersede "operate magnetorquer" if there is insufficient available power to operate the magnetorquer.

The activity set data 420 may be used to determine the proposed plan data 384. The proposed plan data 384 may specify the satellite 102, a priority of the overall plan, information about the activities to be performed, and other information. For example, the proposed plan data 384 may indicate whether the proposed activities are expected to cause the satellite 102 to leave an assigned volume in the orbit 104 that is associated with the assigned ephemeris data 370, information about the satellite systems to be used, and so forth. An example of proposed plan data 384 is shown in FIG. 5E.

The proposed plan data 384 may be used to determine the actual plan data 392. For example, if the activities specified within the proposed plan data 384 are within the limits specified by the automated limit data 382, the proposed plan data 384 may be used as the actual plan data 392. In another example, the proposed plan data 384 may be provided to the operator interface system 312. A human operator or autonomous operator may be presented with the proposed plan data 384 and may approve the proposed plan, modify the proposed plan, deny the proposed plan, or take other steps. The actual plan data 392 may be indicative of one or more activities.

The actual plan data 392 may include one or more activities that have been combined together. For example, the actual plan data 392 may include one or more activities indicated in first proposed plan data 384 associated with the satellite 102, second proposed data 384 associated with the satellite 102, and so forth.

In some implementations, additional confirmation or checking may be performed before the actual plan data 492 is determined. For example, proposed plan data 384 that involves a maneuver may result in consulting with an external system such as one or more SSA systems 320 to determine if the proposed maneuver would result in a possible conjunction event. Response data may be received from the external system and may be used to evaluate the proposed plan data 384. Continuing the example, if the response data indicates a possible conjunction event, the proposed plan data 384 may be rejected and new proposed plan data 384 may be generated.

FIGS. 5A-5E illustrate data associated with operation of the system 100, according to some implementations. The data may include parameters 502 and associated values 504.

As shown in FIG. 5A, the telemetry data 354 may comprise information indicative of the operation of one or more devices onboard the satellite 102. For example, the telemetry data 354 may include one or more of a satellite identifier, position data, propellant quantity, time thruster(s) used, propellant temperature, photovoltaic effectiveness, state of charge, total charge cycles of the battery 234, payload status, reaction wheel saturation(s), single event upset count, and so forth. The satellite identifier is indicative of a particular satellite 102 in the constellation 114. The position data comprises information that is indicative of one or more of position with respect to a reference point and one or more axes, orientation with respect to the one or more axes, and so forth. For example, the position data may be generated by the GNSS 256 and be indicative of a latitude, longitude, altitude, orientation, and so forth. The propellant quantity may indicate a mass of propellant remaining for use by one or more thrusters 242. The time maneuvering system used may be indicative of total elapsed time of operation of the thruster(s) 242. The propellant temperature may be indicative of a temperature of the propellant used by the one or more thrusters 242. The photovoltaic effectiveness may be indicative of performance of the PV array(s) 230. The photovoltaic effectiveness may be assessed relative to a specified baseline, such as relative to a tested engineering baseline. The state of charge may indicate the state of charge of one or more batterie(s) 234, representing how much power is available within the battery 234. The total charge cycles of the battery 234 may be indicative of an accumulated count of charge and discharge cycles the battery 234 has been subjected to. The payload status may be indicative of overall operation of the payload, such as whether the payload is offline by command, offline due to malfunction, operating nominally, operating off-nominally, and so forth. The reaction wheel saturation(s) may be indicative of momentum saturation levels of one or more reaction wheels 240. The single event upset count may be indicative of a number of single event upsets occurring within specified electronic circuitry, such as due to high energy particle impingement on a semiconductor device. The telemetry data 354 may include other data as well.

As shown in FIG. 5A, the state data 378 may include information about the satellite 102, payload, and so forth. The state data 378 may be based at least in part on the telemetry data 354. The state data 378 may include the satellite identifier as described above. The state data 378 may include information indicative of a model, block, version, or build of the satellite 102. The state data 378 may include a satellite overall metric. The satellite overall metric may be indicative of overall usefulness of the satellite 102. For example, the satellite overall metric may comprise a weighted average of propellant quantity, time maneuvering system used, photovoltaic effectiveness, total charge cycles, payload status, and so forth. Over time, as systems onboard the satellite 102 degrade, the value 504 of the satellite overall metric may decrease.

The state data 378 may include a payload metric that is indicative of overall usefulness of the payload. For example, the payload metric may be based on the payload status, state of charge of the batteries 234 providing power to the payload, available transmitter power output, number of devices in the payload that have failed, and forth.

The state data 378 may include a maneuvering system metric that is indicative of capability of the maneuvering system 208. For example, the maneuvering system metric may comprise a weighted average of propellant quantity, time thruster(s) used, propellant temperature, state of charge, reaction wheel saturation(s), and so forth. Over time, as systems onboard the satellite 102 degrade, the value 504 of the maneuvering system metric may decrease.

Automated operation of the CMS 160 may be constrained by the values 504 specified in the automated limit data 382. As shown in FIG. 5B, the automated limit data 382 may include a maximum (max) delta v per maneuver, specifying a maximum permitted change in velocity for a given maneuver or sequence of maneuvers for a particular satellite 102. The automated limit data 382 may specify a max concurrent maneuvers, specifying a maximum number of concurrent maneuvers that are permitted within the constellation 114 at any given time. Max adjacent maneuvers specifies a maximum number of maneuvers that are permitted to occur in adjacent satellites 102. For example, the max adjacent maneuver value 504 may constrain maneuvers that would result in maneuvers of more than three adjacent satellites 102 at one time. A minimum (min) variance to maneuver may specify a minimum variance between an actual and assigned position that will result in event data 402 to maneuver the satellite 102. For example, if the variance between the actual and assigned position exceeds the min variance to maneuver value 504, event data 402 would be generated indicative of the deviation and result in a maneuver to reposition the satellite 102.

The automated limit data 382 may specify a maximum number of activities to satellites per unit time. For example, a maximum number of 75 activities per hour that involve satellites 102 may be permitted by the CMS 160.

A minimum number of alternative inputs to act may be specified. For example, to avoid incorrect activities resulting from poor data from a single source, the CMS 160 may specify that input data from two different systems may be required before generating proposed plan data 384.

The automated limit data 382 may also specify maximum limits on autonomous maneuvers. For example, an "orientation change <" may specify a maximum number of degrees that can be specified by proposed plan data 384 for automatic operation. Orientation change angles that are greater than this value 504 may be submitted to the operator interface system 312 for confirmation by a human operator.

The automated limit data 382 may specify a max power consumed during an activity. For example, activities in proposed plan data 384 that exceed this threshold may be submitted to the operator interface system 312 for confirmation by a human operator.

In other implementations, the automated limit data 382 may include other parameters 502 and associated values 504.

The operator limit data 364 is also shown in FIG. 5B. The operator limit data 364 specifies thresholds as to what activities have been designated as requiring operator approval. In the illustration shown here, the parameters 502 may include a delta v per maneuver that requires operator approval. For example, this may specify a maximum change in velocity due to maneuvering of 1.5 m/s that requires authorization by an operator.

An estimated final propellant value may specify a minimum value of propellant remaining after maneuvering that may be performed automatically. For example, the threshold of estimated final propellant may include reserves to deorbit a satellite 102. This parameter 502 may be used to determine when to have an operator confirm proposed plan data 384 that includes a maneuver that is expected to deplete the propellant below the specified threshold.

The operator limit data 364 may specify whether activities that would result in the satellite 102 leaving its assigned orbital volume require operator approval. For example, if a maneuver is predicted to result in the satellite 102 moving to a different assigned orbital volume, the operator approval may be obtained to confirm the proposed plan data 384. Other activities that the operator limit data 364 may specify requiring operator approval may include changing orbital plane, deorbiting, and so forth.

FIG. 5C illustrates parameters 502 and values 504 that the event data 402 may comprise. An event identifier may be indicative of a particular event, distinguishing one event from another. The event data 402 may include a satellite identifier indicative of the satellite(s) 102 associated with the event data 402. An event type may specify a category of the event, such as "payload orientation out of limit", "payload malfunction", "PV array failure", and so forth. Timing type specifies whether the timing associated with the event is actual or predicted. For example, an actual event may result from an occurrence indicated by the telemetry data 354 while a predicted event may result from a predicted conjunction event with another object. The event data 402 may include a time associated with the event. For example, this may include the actual time the event is determined to have occurred, or a time that is associated with the predicted event. The event data 402 may include other information as well.

The activity data 412 may include the satellite identifier, an activity category, an execute by (time), a complete by (time), and so forth. The activity category is indicative of an overall grouping that is associated with an activity. For example, activities that involve reorienting the satellite 102 may be associated with the activity category of "reorient satellite for payload". The execute by (time) may specify a time when an activity associated with the activity category is expected to begin. In comparison, the complete by (time) may specify the time when the activity associated with the activity category must be completed. For example, the complete by (time) may specify the time at which the reorientation needs to be complete to provide a suitable response to the "payload orientation out of limit" that is predicted to occur. The activity data 412 may include other information as well.

The prioritization data 416 associates a priority value with the activity category indicated by the activity data 412. For example, the activity category "reorient satellite for payload" may be executed with an execute by (time) less than threshold value of "YES" and have a priority of "115". The execute by (time) less than threshold may indicate that the interval between the current time and the execute by (time) specified in the activity data 412 is less than a threshold value. This parameter 502 may be used to prioritize activities that are designated as having a start or execute by time that is rapidly approaching. The priority value associated with the activity category may be manually specified or based on one or more factors. For example, the priority value may be determined based on whether the activity category involves a maneuver, time remaining until the execute by (time), time remaining until the complete by (time), and so forth.

FIG. 5D illustrates activity alternative data 418. As described above, the activity category may be associated with one or more possible activities. The activity alternative data 418 may provide alternative actions that are associated with a particular activity category. The activity alternative data 418 may also include other information associated with the alternative actions. For example, the activity alternative data 418 may indicate a satellite cost value 506, payload cost value 508, and so forth. The satellite cost value 506 is indicative of a cost to the overall satellite 102 that is associated with the activity. For example, the satellite cost value 506 may be calculated based on estimated propellant to be consumed, power to be consumed, total duration of the activity, and so forth. The payload cost value 508 is indicative of a cost to the operation of the payload. The payload cost value 508 may be determined based on a number of customers of the payload that are affected, whether the payload would be usable during the activities, and so forth. For example, the payload cost value may have a maximum value of 255 if the payload is unable to provide service to any UTs 108.

In this illustration, the activity category "reorient satellite for payload" is associated with at least five possible alternative activities: none (drift), have the satellite 102 service a different geographic area on Earth that would not require reorientation, reorienting using propulsion, reorienting using a magnetorquer, reorienting using a reaction wheel, and so forth. Each of these different activities results in different satellite cost values 506 and payload cost values 508. For example, servicing a different geographic area has a relatively low satellite cost value 506 because no power or propellant is consumed, but does have a relatively high payload cost value as service to the originally scheduled geographic area is not possible. In another example, reorientation using propulsion such as the thrusters 242 exhibits a high satellite cost value 506 due to the consumption of propellant while also producing a high payload cost value 508 as the payload may be unable to provide service to the UTs 108 while the thrusters 242 are operating.

The activity set data 420 determined by the prioritization system 390 may also specify a sequence or order in which the activities should be performed. Activities may be sequenced based on priority value, complete by times, system dependences, and so forth. In this example, the activity to operate the magnetorquer to reorient the satellite 102 has been prioritized first with a specified complete by (time), followed by the activities to perform a battery maintenance cycle and PV actuator exercise to move the PV array actuators 232.

As shown at 5E, the proposed plan data 384 includes information such as the satellite identifier, priority of the proposed plan, execute by (time), complete by (time) and other information. For example, the proposed plan data 384 may indicate whether a maneuver is involved, the activity category for one or more of the activities specified, information about the satellite systems used, whether the activity is expected to result in the satellite leaving the assigned orbital volume, and action details such as values 504 for the various parameters 502.

Also shown at 5E is an example of actual plan data 392. In this illustration, the proposed plan data 384 has been approved, and the actual plan data 392 includes information about the priority, timing, and activities to be performed. For example, the actual plan data 392 may specify a window of time within which the plan is to be completed, action details that specify particular commands to be used to operate the satellite 102 to perform the activities, and so forth.

Figure 6:
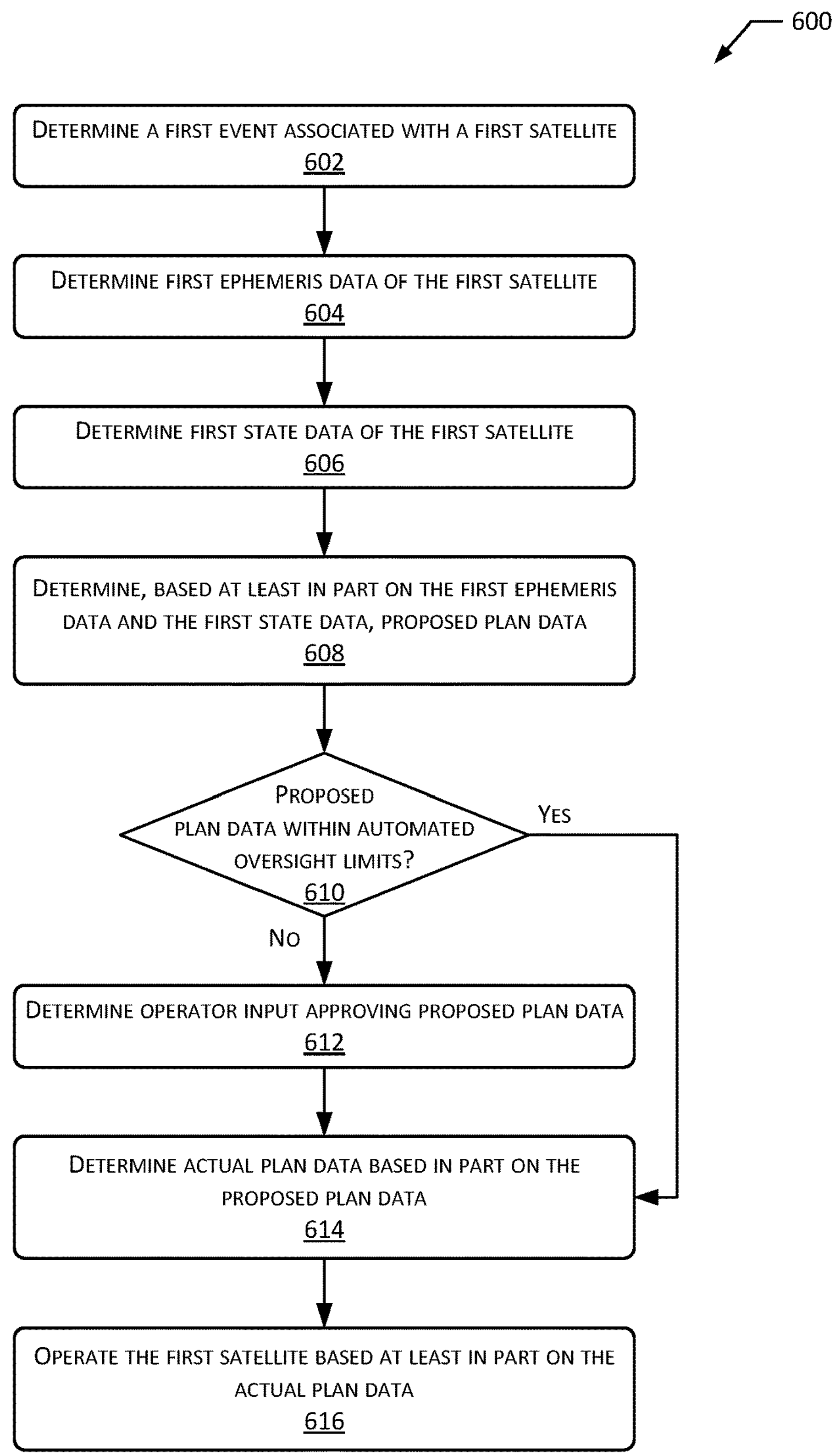
FIG. 6 is a flow diagram of a process of determining actual plan data and operating a satellite based on that actual plan data, according to some implementations.

FIG. 6 is a flow diagram 600 of a process of determining actual plan data 392 and operating a satellite 102 based on that actual plan data 392, according to some implementations. The process may be implemented at least in part by the CMS 160.

At 602 a first event associated with at least a first satellite 102 is determined. For example, the FDS 302 may generate event data 402 indicative of a payload orientation of the first satellite 102 being out of limit at a particular time.

At 604 first ephemeris data of the first satellite 102 is determined. For example, the FDS 302 may generate predicted ephemeris data 374.

At 606 first state data of the first satellite 102 is determined. For example, the state management system 306 may determine state data 378 indicative of available propellant, battery charge, and so forth.

At 608, based at least in part on the first ephemeris data and the first state data 378, proposed plan data 384 is determined. For example, the event processing system 410 of the plan generation system 308 may determine activity data 412. The activity assessment system 414 may then determine prioritization data 416 and activity alternative data 418. The prioritization system 390 may use the prioritization data 416, the activity alternative data 418, and the automated limit data 382 to determine the activity set data 420 and the proposed plan data 384.

At 610 if the proposed plan data 384 includes activities that are outside of the automated oversight limits specified by the automated limit data 382, the process proceeds to 612. If the proposed plan data 384 includes activities that are within the automated oversight limits specified by the automated limit data 382, the process proceeds to 614.

The automated limit data 382 may place constraints on individual activities, groups of activities, or activities across two or more satellites 102 in the constellation 114. In one implementation, the plan generation system 308 may determine a first set of proposed plan data that includes the first proposed plan data 384. The first set of proposed plan data is also indicative of proposed activities involving a first count of satellites 102 in the constellation 114 within a first time interval. The proposed plan data 384 may be approved for further action if the first count is less than a threshold value. If the first count is greater than or equal to the threshold value, the proposed plan data 384 may be presented for operator confirmation, such as via the operator interface system 312, may be delayed, or other actions may be taken. For example, the automated limit data 382 may limit the number of concurrent maneuvers by satellites 102 within the constellation 114 to 195. Continuing the example, this limit may be used to prevent large-scale simultaneous maneuvers that could complicate operation of the FDS 302.

At 612, operator input approving the proposed plan data 384 is obtained. For example, the operator interface system 312 may present the proposed plan data 384 to an operator for approval, modification, denial, or other action. Once approved or modified, the process continues to 614.

At 614 actual plan data 392 is determined based in part on the proposed plan data 384. For example, the proposed plan data 384 may be approved and used as the actual plan data 392. In another example, a human operator may add or modify one or more additional activities of the proposed plan data 384 to determine the actual plan data 392.

At 616, the first satellite 102 is operated based at least in part on the actual plan data 392. For example, the actual plan data 392 may be provided to the satellite mission control system 314. The satellite mission control system 314 may determine control data 398 comprising one or more commands to operate one or more devices onboard the first satellite 102.

Figure 7:
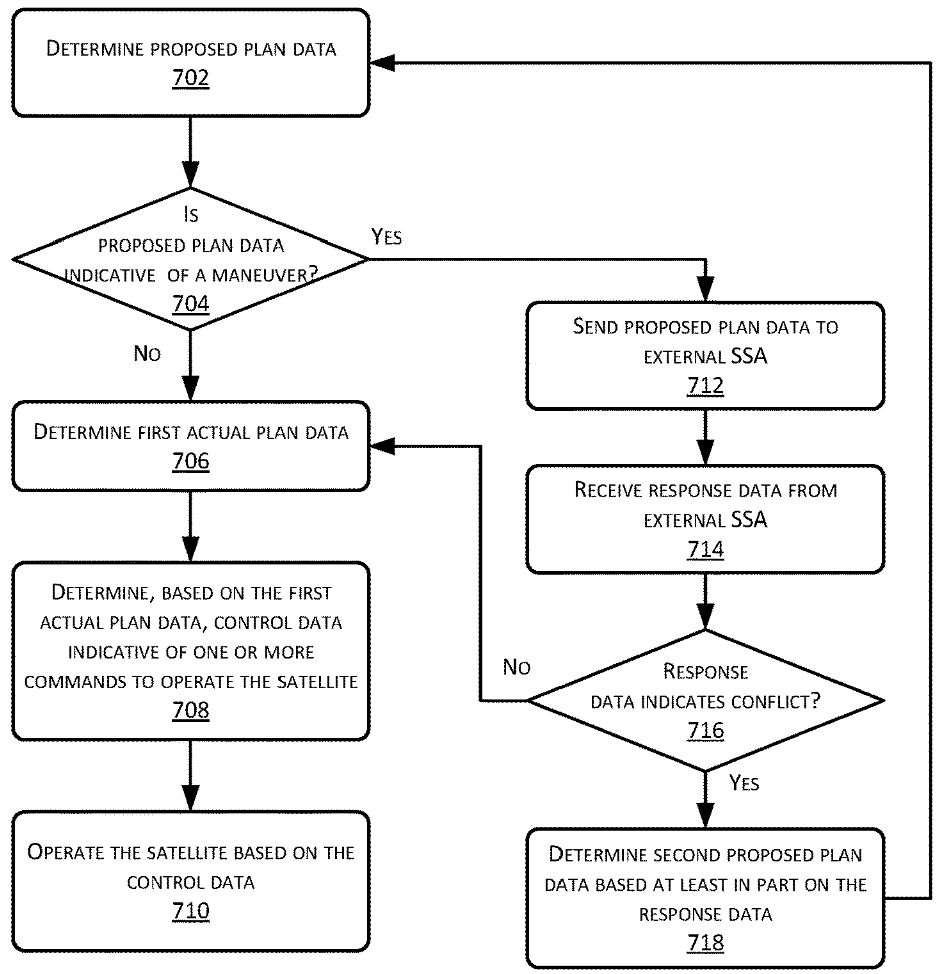
FIG. 7 is a flow diagram of another process of determining actual plan data and operating a satellite based on that actual plan data, according to some implementations.

FIG. 7 is a flow diagram 700 of another process of determining actual plan data 392 and operating a satellite 102 based on that actual plan data 392, according to some implementations. The process may be implemented at least in part by the CMS 160.

At 702, proposed plan data 384 is determined. For example, the plan generation system 308 may determine the proposed plan data 384 in response to event data 402. Continuing the example, the FDS 302 may determine event data 402 indicative of a potential conjunction event with another object.

At 704 a determination is made as to whether the propose plan data 384 is indicative of a maneuver. If no, the process may proceed to 706. If yes, the process may proceed to 712.

At 706 the first actual plan data 392 is determined. For example, if no changes were made to the proposed plan data 384, the proposed plan data 384 may be used as the first actual plan data 392.

At 708 control data 398 is determined based on the first actual plan data 392. For example, the satellite mission control system 314 may use the actual plan data 392 to determine the control data 398 that comprises one or more commands to operate the satellite 102.

At 710 the satellite 102 is operated based on the control data 398. For example, the satellite mission control system 314 may send the control data 398 to the satellite 102 for execution.

Returning to 704, if the proposed plan data 384 is indicative of a maneuver, at 712 the proposed plan data 384 or a portion thereof is sent to the external SSA system 320. For example, information about the proposed maneuver and predicted ephemeris data 374 associated with the completion of the proposed maneuver may be sent to the SSA system 320. The SSA system 320 may process the information and determine if the proposed maneuver would result in an adverse outcome such as a possible conjunction event, possible interference event, and so forth. The SSA system 320 may provide response data indicative of this determination to the CMS 160.

At 716 if the response data indicates no conflict, the process proceeds to 706. If the response data from the SSA system 320 indicates a possible adverse outcome, the process proceeds to 718.

At 718 second proposed plan data 384 is determined based at least in part on the response data. For example, if the response data indicates a possible conjunction event, the second proposed plan data 384 may be determined that indicates a different maneuver to avoid the adverse outcome.

In some implementations a determination to proceed with using the proposed plan data 384 without waiting for the response data may be made. For example, a maneuver may require some amount of time to perform and may need to be performed at a particular time. If no response is received from the SSA system 320 before the command to execute the maneuver is due to be initiated, the system may proceed from 716 to 706.

Figure 8:
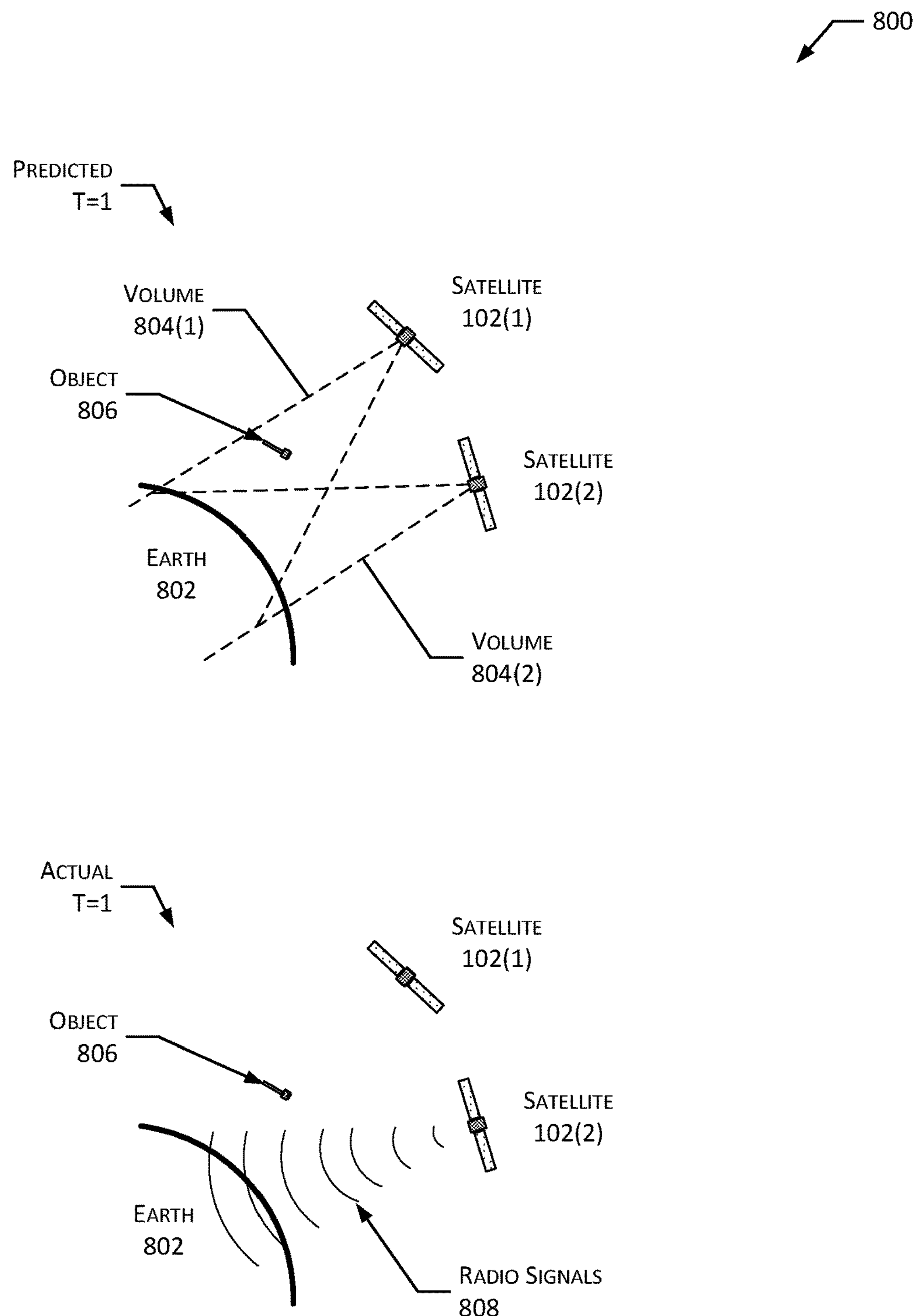
FIG. 8 illustrates an object entering a volume associated with operation of a payload of a first satellite and a mitigating action, according to some implementations.

FIG. 8 illustrates at 800 an object entering a volume associated with operation of a payload of a first satellite 102 and a mitigating action, according to some implementations. The service provided by the payload of the satellite 102 may involve transmitting a radio signal, receiving a radio signal, operating one or more sensors to acquire remote sensing data, and so forth.

In this illustration, the Earth 802 is shown, with a first satellite 102(1) and a second satellite 102(2) shown in orbit 104. Each satellite 102 has an associated volume 804 of space that is associated with the respective payload. For example, a first volume 804(1) of space may represent a solid angle that includes a first radio signal generated by a radio transmitter and emitted by an antenna 282 in a first payload of the first satellite 102(1) while a second volume 804(2) of space is representative of a second radio signal from a second payload of the second satellite 102(2).

As shown here, an object 806 is predicted to be within the first volume 804(1) at time T=1. Due to the different relative position of the second satellite 102(2) in this illustration, the second volume 804(2) does not include the object 806. The object 806 may include another satellite 102 in the constellation 114, other satellite 102, debris, and so forth.

In some implementations, the FDS 302 may determine the predicted locations of the satellites 102, objects 806, orientation of the volumes 804 associated with the payloads of the satellites 102, and so forth.

Operation of a payload may be modified based on the presence of an object 806 within the volume 804(1). For example, if the payload is a synthetic aperture radar, the presence of the object 806 may occlude and otherwise interfere with acquiring data about features on the Earth 802. In another example, if the payload is a radio transmitter and the object 806 includes a radio receiver at or near the same frequency, output from the radio transmitter could overload the radio receiver of the object 806.

The FDS 302 may generate interference mitigation data 376. For example, the interference mitigation data 376 may indicate the volume 804 includes an object 806 that could affect the payload of the satellite 102, or that the volume 804 includes an object 806 that could be affected by the payload of the satellite 102. Continuing the example, the interference mitigation data 376 may indicate that at time T=1, the first satellite 102(1) will have the object 806 within the first volume 804(1) while the second satellite 102(2) has no object 806 within the second volume 804(2).

Based at least in part on the interference mitigation data 376, the system 100 may mitigate potential interference involving the object 806. For example, the first payload, or a portion thereof, of the first satellite 102(1) may be deactivated at time T=1 and instead, the second payload of the second satellite 102(2) at time T=1 may be used to provide service to the particular location on the Earth 802, as shown at actual T=1 in the illustration. Continuing the example, the network management system 150 may use the interference mitigation data 376 provided by the FDS 302 to determine which satellite 102 will provide service to a particular location on the Earth 802.

Interference mitigation may include other activities as well. For example, the payload may be operated to use a third volume 804 that is predicted to not include the object 806. In another example, the first satellite 102(1) may be reoriented so the first volume 804(1) no longer includes the object 806.

Figure 9:
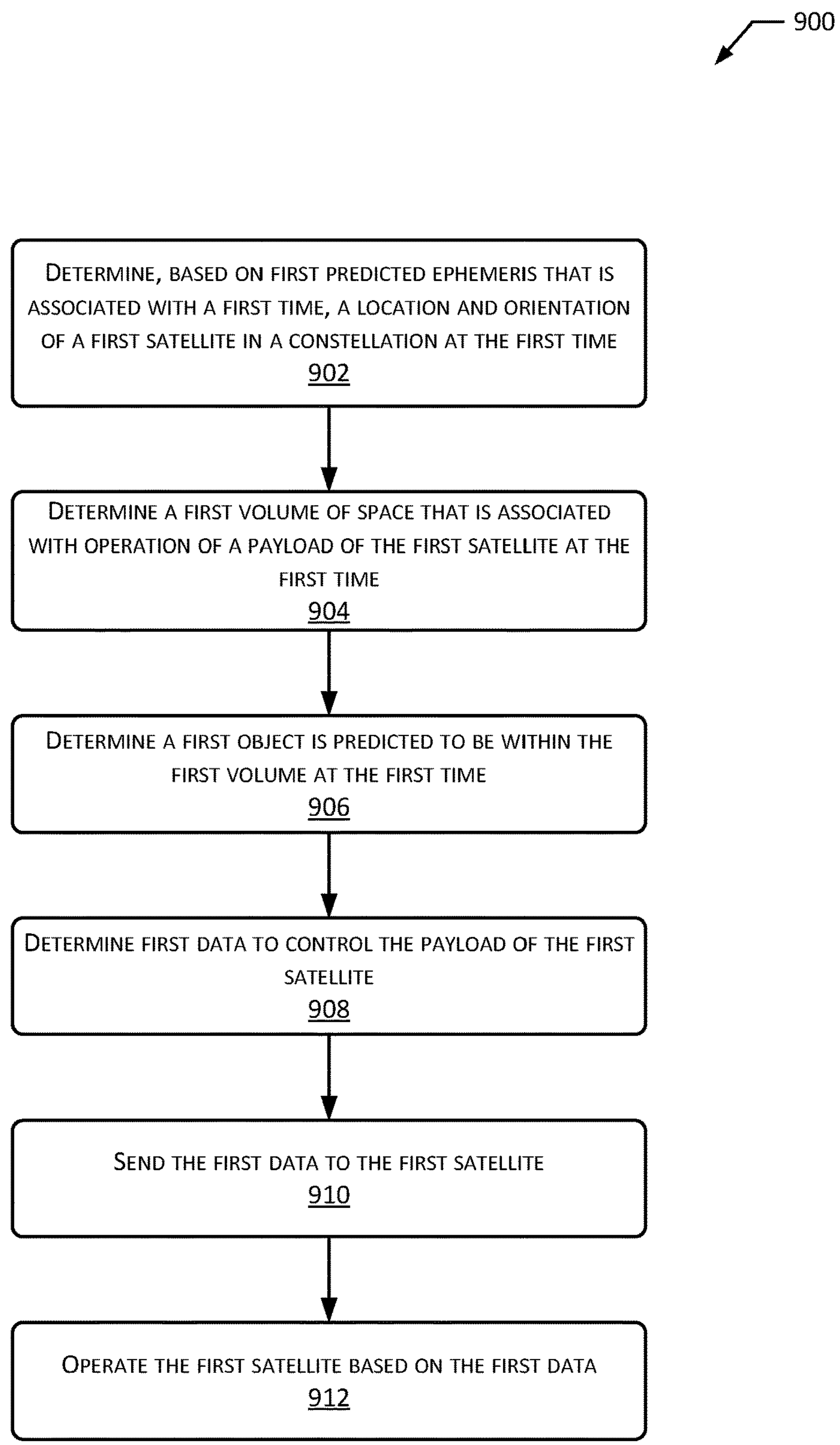
FIG. 9 is a flow diagram of a process of operating a satellite based on a determination that an object is within a volume associated with operation of a payload, according to some implementations.

FIG. 9 is a flow diagram 900 of a process of operating a satellite 102 based on a determination that an object 806 is within a volume 804 associated with operation of a payload, according to some implementations.

At 902, based on first predicted ephemeris data 374 that is associated with a first time, a location and orientation of a first satellite 102(1) in a constellation 114 at the first time is determined. For example, the FDS 302 may determine a location and orientation of the first satellite 102(1) at time t=1 in the future.

At 904 a first volume 804(1) of space that is associated with operation of a payload of the first satellite 102(1) at the first time is determined. For example, a solid angle may be determined that is associated with an antenna radiation pattern from the antennas 282 onboard the first satellite 102(1).

At 906, a first object 806 is predicted to be within the first volume 804(1) at the first time. For example, the location of the first object 806 may be determined by the FDS 302 based on the SSA data 322 received from the SSA system(s) 320.

At 908 first data to control the payload of the first satellite 102(1) is determined. For example, the plan generation system 308 may generate actual plan data 392. The satellite mission control system 314 may use the actual plan data 392 to determine control data 398.

At 910 the first data is sent to the first satellite 102(1). For example, the control data 398 may be transmitted to the first satellite 102(1) by a ground station 106.

At 912 the first satellite 102(1) is operated based on the first data. For example, the first satellite 102(1) may execute the control data 398.

Times, intervals, durations, and the like as used in this disclosure may be specified with respect to actual clock time, system time, system timing references, discrete timeslots, interval indicators, and so forth. For example, time ticks may be specified relative to an epoch that resets at 10-minute intervals. In another example, actual clock time obtained from the Global Position System or other precision timing system may be used.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
- a constellation of artificial satellites orbiting a first body, the constellation of artificial satellites comprising a first satellite; and
- a computer system configured to:
  - receive first data indicative of ephemeris of objects orbiting the first body;
  - receive second data indicative of space weather;
  - receive third data indicative of status of one or more global navigation satellite systems;
  - receive fourth data indicative of telemetry from at least the first satellite;
  - determine, based at least in part on the first data, the second data, the third data, and the fourth data, fifth data indicative of ephemeris of the first satellite;
  - determine, based at least in part on the fifth data, that the first satellite is scheduled to service a first geographic area at a first time;
  - determine, based at least in part on the first data, that a first object is predicted to interfere with the first satellite servicing the first geographic area at the first time; and
  - determine, in response to the first object being predicted to interfere with the first satellite servicing the first geographic area at the first time, one or more commands that cause the first satellite to perform one or more of:
    - operate the first satellite to service a second geographic area at the first time, wherein the first object is not predicted to interfere with the first satellite servicing the second geographic area at the first time, or
    - reorient the first satellite so that the first object is no longer predicted to interfere with the first satellite servicing the first geographic area at the first time.

2. The system of claim 1, the computer system further configured to:
- determine first proposed plan data;
- determine at least a portion of the first proposed plan data exceeds a value of automated limit data;
- present the first proposed plan data via a user interface;
- receive, via the user interface, an input indicative of approval of the first proposed plan data; and
- determine first actual plan data based on the first proposed plan data, wherein the first actual plan data comprises the first proposed plan data, and wherein the one or more commands are based on the first actual plan data.

3. The system of claim 1, the computer system further configured to:
- determine a first sum of a first satellite cost value and a first payload cost value for operating of the first satellite to service the second geographic area;
- determine a second sum of a second satellite cost value and a second payload cost value for reorienting the first satellite;
- determine the first sum is less than the second sum; and
- wherein the one or more commands are indicative of operating the first satellite to service the second geographic area, responsive to the first sum being less than the second sum.

4. The system of claim 1, the computer system further configured to:
- determine first proposed plan data;
- determine a first set of proposed plan data that includes the first proposed plan data, wherein the first set of proposed plan data is indicative of proposed activities involving a first count of satellites in the constellation of artificial satellites within a first time interval;
- determine the first count is less than a threshold value; and
- wherein the one or more commands are based on the first proposed plan data, responsive to the first count being less than the threshold value.

5. The system of claim 1, wherein:
- the first satellite is reoriented using one or more of:
  - propulsion,
  - a magnetorquer, or
  - a reaction wheel.

6. The system of claim 1, the computer system further configured to:

determine a first sum of a first satellite cost value and a first payload cost value to operate the first satellite to service the second geographic area;

determine a second sum of a second satellite cost value and a second payload cost value to reorient the first satellite; and determine the first sum is greater than the second sum; and wherein the one or more commands are indicative of reorienting the first satellite, responsive to the first sum being greater than the second sum.

7. The system of claim 1, the computer system further configured to:

determine first proposed plan data;

determine that the first proposed plan data is indicative of a maneuver associated with the first satellite;

send the first proposed plan data to a space situation awareness system, wherein the space situation awareness system maintains information about one or more tracked objects associated with the first body;

receive, from the space situation awareness system, response data; and wherein the one or more commands are based on the response data.

8. The system of claim 1, the computer system further configured to:

determine a first proposed activity, comprising the operating the first satellite to service the second geographic area, having a first cost value; and determine a second proposed activity, comprising the reorienting the first satellite, having a second cost value; and wherein the one or more commands are based on the second proposed activity, responsive to the second cost value being less than the first cost value.

9. The system of claim 1, the computer system further configured to:

determine a first proposed activity, comprising the operating the first satellite to service the second geographic area, having a first cost value; and determine a second proposed activity, comprising the reorienting the first satellite having a second cost value, wherein the first cost value is less than the second cost value; and wherein the one or more commands are based on the first proposed activity, responsive to the first cost value being less than the second cost value.

10. A computer-implemented method comprising:

receiving first data indicative of ephemeris of one or more objects orbiting a first body;

receiving second data indicative of space weather;

receiving third data indicative of status of a navigation system that provides position data to one or more satellites in a constellation;

receiving fourth data indicative of telemetry from the one or more satellites in the constellation;

determining, based at least in part on one or more of the first data, the second data, the third data, or the fourth data, fifth data indicative of ephemeris data of the one or more satellites in the constellation;

determining, based at least in part on the fifth data, that a first satellite is scheduled to service a first geographic area at a first time;

determining, based at least in part on the first data, that a first object is predicted to interfere with the first satellite servicing the first geographic area at the first time;

determining a first event associated with the first satellite in the constellation, wherein the first event is associated with the first object being predicted to interfere with the first satellite servicing the first geographic area at the first time;

determining, responsive to the first event, first proposed plan data wherein the first proposed plan data is indicative of a first proposed activity and a second proposed activity;

determining sixth data indicative of one or more commands associated with the second proposed activity, wherein the sixth data is indicative of the one or more commands for the first satellite to perform one or more of:

operate the first satellite to service a second geographic area at the first time, wherein the first object is not predicted to interfere with the first satellite servicing the second geographic area at the first time, or reorient the first satellite so that the first object is no longer predicted to interfere with the first satellite servicing the first geographic area at the first time; and sending the sixth data to the first satellite, wherein the first satellite executes the one or more commands.

11. The computer-implemented method of claim 10, further comprising:

determining a first set of proposed plan data that includes the first proposed plan data, wherein the first set of proposed plan data is indicative of proposed activities involving a first count of satellites in the constellation within a first time interval; and wherein the determining the sixth data is associated with determining the first count is less than a threshold value.

12. The computer-implemented method of claim 10, further comprising:

determining that the first proposed plan data is indicative of a maneuver associated with the first satellite;

sending the first proposed plan data to an external system;

receiving, from the external system, response data; and wherein the determining the sixth data is based on the response data.

13. The computer-implemented method of claim 10, further comprising:

determining, based on the first event:

the first proposed activity having a first cost value, and the second proposed activity having a second cost value, wherein the second cost value is less than the first cost value; and wherein the determining the first proposed plan data is based on the first cost value and the second cost value.

14. The computer-implemented method of claim 10, further comprising:

responsive to the first event, determining a second event associated with the first satellite;

determining a third proposed activity that is associated with the second event; and wherein the first proposed plan data is further based on the third proposed activity.

15. The computer-implemented method of claim 10, wherein the second proposed activity comprises one or more maneuvers of the first satellite; and the method further comprising:

determining that the one or more maneuvers result in a predicted orbit that is free from conjunction with one of the one or more objects orbiting the first body as indicated by the first data;

determining that resource consumption associated with the one or more maneuvers is below a first threshold value; and determining that the predicted orbit is within a second threshold value of a first orbit assigned to the first satellite.

16. A system comprising:

a computer system configured to:

receive first data indicative of ephemeris of one or more objects orbiting a first body;

receive second data indicative of space weather;

receive third data indicative of status of one or more global navigation satellite systems that provide position data to one or more satellites in a constellation;

receive fourth data indicative of telemetry from the one or more satellites in the constellation;

determine, based at least in part on the fourth data, that a first satellite of the one or more satellites is scheduled to service a first geographic area at a first time;

determine, based at least in part on the first data, that a first object is predicted to interfere with the first satellite servicing the first geographic area at the first time;

determine a first event that is associated with the first satellite, wherein the first event is associated with the first object being predicted to interfere with the first satellite servicing the first geographic area;

determine fifth data indicative of one or more limits associated with automatic operation of the one or more satellites;

determine first plan data;

determine sixth data indicative of one or more commands associated with the first plan data, wherein the sixth data is indicative of the one or more commands for the first satellite to perform one or more of:

operate the first satellite to service a second geographic area at the first time, wherein the first object is not predicted to interfere with the first satellite servicing the second geographic area at the first time, or reorient the first satellite so that the first object is no longer predicted to interfere with the first satellite servicing the first geographic area; and operate the first satellite responsive to the one or more commands.

17. The system of claim 16, the computer system further configured to:

determine at least a portion of the first plan data exceeds one or more values indicated by the fifth data;

present at least a portion of the first plan data via a user interface;

receive, via the user interface, seventh data indicative of approval of the first plan data; and wherein the determining the sixth data is based on the seventh data.

18. The computer-implemented method of claim 10, further comprising:

determining a first satellite cost value and a first payload cost value for operating the the first satellite to service the second geographic area;

determining a second satellite cost value and second payload cost value for reorienting the first satellite; and selecting to perform either the operating the first satellite to service the second geographic area or the reorienting the first satellite based on one or more of:

a first sum of the first satellite cost value and the first payload cost value, or a second sum of the second satellite cost value and the second payload cost value.

19. The system of claim 16, the computer system further configured to:

determine a first satellite cost value and a first payload cost value for operating the first satellite to service the second geographic area;

determine a second satellite cost value and a second payload cost value for reorienting the first satellite; and select to perform either the operating the first satellite to service the second geographic area or the reorienting the first satellite based on one or more of:

a first sum of the first satellite cost value and the first payload cost value, or a second sum of the second satellite cost value and the second payload cost value.

20. The system of claim 16, the computer system further configured to:

determine a low satellite cost value and a high payload cost value for operating the first satellite to service the second geographic area; and select to operate the first satellite to service the second geographic area based on a sum of the low satellite cost value and the high payload cost value.

* * * * *